United States Patent [19]
Sato

[11] Patent Number: 5,760,906
[45] Date of Patent: Jun. 2, 1998

[54] SHAPE MEASUREMENT APPARATUS AND METHOD

[75] Inventor: Tsuyoshi Sato, Tokyo, Japan

[73] Assignee: Technology Research Association of Medical and Welfare Apparatus, Tokyo, Japan

[21] Appl. No.: 769,243

[22] Filed: Dec. 18, 1996

[30]    Foreign Application Priority Data

Dec. 27, 1995  [JP]  Japan ................................. 7-351923
Dec. 27, 1995  [JP]  Japan ................................. 7-351925
Dec. 27, 1995  [JP]  Japan ................................. 7-351926

[51] Int. Cl.$^6$ ......................................... G01B 11/24
[52] U.S. Cl. .................................. 356/376; 250/559.23
[58] Field of Search .......................... 356/375, 376; 250/559.22, 559.23

[56]               References Cited

U.S. PATENT DOCUMENTS 5,118,192  6/1992  Chen et al. ............................. 356/376
5,369,490  11/1994  Kawai et al. ........................... 356/376
5,548,405  8/1996  Motosugi .............................. 356/376

OTHER PUBLICATIONS

"Patent Abstracts of Japan", No. 07-0555438, Mar. 1995, English abstracts.

*Primary Examiner*—F. L. Evans
*Attorney, Agent, or Firm*—Foley & Lardner

[57]                ABSTRACT

A shape measurement apparatus of this invention includes (i) an optical distance measuring device which measures the distance to the point to be measured on the object to be measured, (ii) a position setting/changing mechanism which sets and changes the relative positional relationship between the object to be measured and the optical distance measuring device, and can set, for each point to be measured, a plurality of different angles including $\alpha$ and $-\alpha$ ($0° \leq \alpha \leq 90°$) in an identical plane as the tilt angle of the surface of the object to be measured with respect to a plane perpendicular to the optical axis of the optical distance measuring device, (iii) a position detection mechanism for detecting the relative position between the optical distance measuring device and the point to be measured, and (iv) a shape data forming unit for forming shape data of the object to be measured on the basis of position data and distance data which respectively represent the relative position and the distance between the point to be measured and the optical distance measuring device. This arrangement can reduce measurement errors caused by the irradiation angle of the measurement light from the optical distance measuring device to the object to be measured.

28 Claims, 18 Drawing Sheets

SHAPE MEASUREMENT APPARATUS AND METHOD

BACKGROUND OF THE INVENTION

1. Field of the Invention

The present invention relates to a shape measurement apparatus and method, which measure the shape of the object to be measured using an optical distance measuring device, e.g., a laser displacement meter. The present invention also relates to a shape measurement apparatus and method, which measure the shape of the object to be measured using a distance measuring device which includes not only the optical distance measuring device but also the other type distance measuring device which adopts a measurement principle different from that of the optical distance measuring device. More specifically, the present invention relates to a shape measurement apparatus and method, which can suitably measure an object to be measured having a complicated shape such as a three-dimensional shape (e.g., a free curved surface or the like).

2. Related Background Art

In recent years, measurements of objects to be measured having three-dimensional shapes are attained not only by combinations of one-dimensional measurements such as height measurements, length measurements, and the like, but also by three-dimensional measurements of objects having free curved surfaces. Many attempts have been made to measure such objects to be measured with high precision. For example, as conventional shape measurement methods, a non-contact type measurement method using an optical distance measuring device such as a laser displacement meter that has seen a remarkable development recently is known in addition to the contact type measurement method that performs measurements while bringing a contact probe into contact with the object to be measured.

According to the non-contact type measurement method, since the probe need not be brought into contact with the object to be measured, even a soft object such as a rubber member can be measured with high precision. Also, the non-contact type measurement method can shorten the measurement time as compared to the contact type measurement method. In particular, for an object to be measured having a two-dimensional shape, the optical distance measuring device can easily perpendicularly irradiate measurement light onto the object to be measured, i.e., the irradiation angle of the measurement light does not deviate from 90° with respect to the surface where the points to be measured are located (that is, oblique or slanted irradiation can be prevented), thus assuring high measurement precision.

In general, in these contact or non-contact type measurement methods, measurements of the object to be measured are attained by changing the relative positional relationship between the object to be measured and the measurement system little by little, i.e., performing scanning. When the object to be measured has a simple shape, all the necessary measurement data of the object to be measured can be obtained by the scanning operation performed in one direction at predetermined pitches, i.e., by only one scanning method.

On the other hand, when the shape of the object to be measured is a complicated free curved surface, all the necessary measurement data of the object to be measured can be obtained by a plurality of different scanning methods. In the shape measurements using a plurality of different scanning methods, the measurement data of the object to be measured obtained by the individual scanning methods must be combined to obtain the entire shape of the object to be measured.

SUMMARY OF THE INVENTION

It is an object of the present invention to provide a shape measurement apparatus and method, which can perform precise measurements of even an object to be measured having an arbitrary shape by reducing measurement errors caused by the irradiation angle of measurement light from an optical distance measuring device with respect to the object to be measured, i.e., the tilt of the surface where points to be measured are located with respect to the optical axis of the optical distance measuring device.

It is another object of the present invention to provide a shape measurement apparatus and method, which can perform precise measurements of even an object to be measured having an arbitrary shape by reducing measurement errors caused by discontinuities in the surface generated at the joint portion of measurement data of the object to be measured on the basis of a plurality of different scanning methods.

Especially, it is still another object of the present invention to provide a shape measurement apparatus and method, which can attain precise measurements by obtaining accurate measurement data corresponding to the actual shape of the object to be measured with respect to even an object to be measured having a complicated free curved surface as a three-dimensional shape.

In order to achieve the above objects, a shape measurement apparatus of the present invention comprises (i) an optical distance measuring device which comprises an irradiation unit for irradiating measurement light onto a point to be measured on an object to be measured, and a light-receiving unit for receiving the measurement light reflected at the point to be measured, and measures a distance to the point to be measured, (ii) a position setting/changing mechanism which sets and changes the point to be measured by setting and changing a relative positional relationship between the object to be measured and the optical distance measuring device, and can set, for each point to be measured, a plurality of different angles including $\alpha$ and $-\alpha$ ($0° \leq \alpha 90°$) in an identical plane as a tilt angle of a surface of the object to be measured with respect to a plane perpendicular to an optical axis of the optical distance measuring device, (iii) a position detection mechanism for detecting a relative position between the optical distance measuring device and the point to be measured, which is set or changed by the position setting/changing mechanism, and (iv) a shape data forming unit for forming shape data of the object to be measured on the basis of position data detected by the position detection mechanism and representing the relative position between the point to be measured and the optical distance measuring device, and distance data measured by the optical distance measuring device and representing the distance between the point to be measured and the optical distance measuring device.

Note that the shape measurement apparatus desirably further comprises a control mechanism for controlling operations of the optical distance measuring device, the position setting/changing mechanism, the position detection mechanism, and the shape data forming unit.

The shape measurement apparatus of the present invention preferably further comprises a data storage unit for storing the distance data to the point to be measured by the optical distance measuring device, and the position data of the point to be measured detected by the position detection mechanism.

Note that the shape measurement apparatus desirably further comprises a control mechanism for controlling operations of the optical distance measuring device, the position setting/changing mechanism, the position detection mechanism, the data storage unit, and the shape data forming unit.

The shape measurement apparatus of the present invention preferably further comprises an arithmetic processing unit for calculating an average value of a plurality of different distance data measured by the optical distance measuring device in correspondence with different setting states of the optical axis of the optical distance measuring device at each point to be measured, and outputting the average value as regular distance data to the shape data forming unit.

Note that the shape measurement apparatus desirably further comprises a control mechanism for controlling operations of the optical distance measuring device, the position setting/changing mechanism, the position detection mechanism, the arithmetic processing unit, and the shape data forming unit.

In this case, the shape measurement apparatus more preferably further comprises a data storage unit for storing the distance data to the point to be measured by the optical distance measuring device, and the position data of the point to be measured detected by the position detection mechanism.

Note that the shape measurement apparatus desirably further comprises a control mechanism for controlling operations of the optical distance measuring device, the position setting/changing mechanism, the position detection mechanism, the data storage unit, the arithmetic processing unit, and the shape data forming unit.

Desirably, when only one distance data is obtained at each point to be measured, the arithmetic processing unit outputs the distance data as regular distance data to the shape data forming unit.

In the shape measurement apparatus of the present invention, preferably, the arithmetic processing unit checks if a difference between two different distance data, which are arbitrarily selected from a plurality of different distance data corresponding to the different setting states of the optical axis of the optical distance measuring device at each point to be measured, exceeds a reference value, calculates the average value of the two different distance data and outputs the average value as regular distance data to the shape data forming unit when the difference between the two different distance data does not exceed the reference value, and selects one, which has higher continuity with regular distance data at the points to be measured located in the vicinity of the point to be measured, from the two different distance data, and outputs the selected distance data as regular distance data to the shape data forming unit when the difference between the two different distance data exceeds the reference value.

Furthermore, in the shape measurement apparatus of the present invention, the position setting/changing mechanism preferably sets and changes the relative positional relationship between the object to be measured having a three-dimensional shape and the optical distance measuring device, and the shape data forming unit forms three-dimensional shape data as the shape data of the object to be measured.

In order to achieve the above objects, a shape measurement apparatus of the present invention comprises (i) a distance measuring device for measuring a distance to a point to be measured on an object to be measured, (ii) a position setting/changing mechanism which sets and changes the point to be measured by setting and changing a relative positional relationship between the object to be measured and the distance measuring device, and can set a plurality of different positions as a position of the distance measuring device with respect to each point to be measured, (iii) a position detection mechanism for detecting a relative position between the distance measuring device and the point to be measured, which is set or changed by the position setting/changing mechanism, (iv) an arithmetic processing unit for calculating a weighted mean value of a plurality of different distance data corresponding to different setting states of the position of the distance measuring device at each point to be measured as distance data measured by the distance measuring device and representing the distance between the point to be measured and the distance measuring device, and extracting the weighted mean value as regular distance data, and (v) a shape data forming unit for forming shape data of the object to be measured on the basis of position data detected by the position detection mechanism and representing the relative position between the point to be measured and the distance measuring device, and the regular distance data at the point to be measured extracted by the arithmetic processing unit.

Note that the shape measurement apparatus desirably further comprises a control mechanism for controlling operations of the distance measuring device, the position setting/changing mechanism, the position detection mechanism, the arithmetic processing unit, and the shape data forming unit.

The shape measurement apparatus of the present invention preferably further comprises a data storage unit for storing the distance data to the point to be measured by the distance measuring device, and the position data of the point to be measured detected by the position detection mechanism.

Note that the shape measurement apparatus desirably further comprises a control mechanism for controlling operations of the distance measuring device, the position setting/changing mechanism, the position detection mechanism, the data storage unit, the arithmetic processing unit, and the shape data forming unit.

Also, desirably, when only one distance data is obtained at each point to be measured, the arithmetic processing unit outputs the distance data as regular distance data to the shape data forming unit.

In the shape measurement apparatus of the present invention, the position setting/changing mechanism preferably sets and changes the relative positional relationship between the object to be measured having a three-dimensional shape and the distance measuring device, and the shape data forming unit forms three-dimensional shape data as the shape data of the object to be measured.

In order to achieve the above objects, a shape measurement method of the present invention comprises (i) the first step of setting a plurality of different angles including $\alpha$ and $-\alpha$ ($0° \leq 90°$), in an identical plane as a tilt angle of a surface of an object to be measured with respect to a plane perpendicular to an optical axis of an optical distance measuring device by setting and changing, using a position setting/changing mechanism, a point to be measured on the object to be measured by setting and changing a relative positional relationship between the object to be measured and the optical distance measuring device, (ii) the second step of detecting, using a position detection mechanism, a relative position between the optical distance measuring device and the point to be measured, which is set or changed by the position setting/changing mechanism in the first step, and measuring a distance between the point to be measured and the optical distance measuring device by irradiating measurement light from an irradiation unit of the optical distance measuring device onto the point to be measured and receiving the measurement light reflected at the point to be measured, and (iii) the third step of forming shape data of the object to be measured using a shape data forming unit on the basis of position data detected by the position detection mechanism in the second step and representing the relative position between the point to be measured and the optical distance measuring device, and distance data measured by the optical distance measuring device and representing the distance between the point to be measured and the optical distance measuring device.

In the shape measurement method of the present invention, the second step preferably includes the step of storing, in a data storage unit, the distance data to the point to be measured, which is measured by the optical distance measuring device, and the position data of the point to be measured, which is detected by the position detection mechanism.

In the shape measurement method of the present invention, the third step preferably includes the step of calculating, using an arithmetic processing unit, an average value of a plurality of different distance data measured by the optical distance measuring device in correspondence with different setting states of the optical axis of the optical distance measuring device at each point to be measured, and outputting the average value as regular distance data to the shape data forming unit.

In this case, the second step preferably includes the step of storing, in a data storage unit, the distance data to the point to be measured, which is measured by the optical distance measuring device, and the position data of the point to be measured, which is detected by the position detection mechanism.

Note that the third step desirably includes the step of outputting one distance data as regular distance data from the arithmetic processing unit to the shape data forming unit when only the one distance data is obtained at each point to be measured.

In the shape measurement method of the present invention, the third step preferably includes the step of checking, using the arithmetic processing unit, if a difference between two different distance data, which are arbitrarily selected from a plurality of different distance data corresponding to the different setting states of the optical axis of the optical distance measuring device at each point to be measured, exceeds a reference value, calculating the average value of the two different distance data and outputting the average value as regular distance data from the arithmetic processing unit to the shape data forming unit when the difference between the two different distance data does not exceed the reference value, and selecting one, which has higher continuity with regular distance data at the points to be measured located in the vicinity of the point to be measured, from the two different distance data, and outputting the selected distance data as regular distance data from the arithmetic processing unit to the shape data forming unit when the difference between the two different distance data exceeds the reference value.

Furthermore, in the shape measurement method of the present invention, the first step preferably includes the step of setting and changing, using the position setting/changing mechanism, the relative positional relationship between the object to be measured having a three-dimensional shape and the optical distance measuring device, and the third step includes the step of forming, using the shape data forming unit, three-dimensional data as the shape data of the object to be measured.

In order to achieve the above objects, a shape measurement method of the present invention comprises (i) the first step of setting a plurality of different positions as a position of a distance measuring device with respect to each point to be measured by setting and changing, using a position setting/changing mechanism, the point to be measured on an object to be measured by setting and changing a relative positional relationship between the object to be measured and the distance measuring device, (ii) the second step of detecting, using a position detection mechanism, a relative position between the distance measuring device and the point to be measured, which is set or changed in the first step, and measuring, using the distance measuring device, a distance between the point to be measured and the distance measuring device, (iii) the third step of calculating, using an arithmetic processing unit, a weighted mean value of a plurality of different distance data corresponding to different setting states of the position of the distance measuring device as distance data which is measured by the distance measuring device in the second step and represents the distance between the point to be measured and the distance measuring device, and extracting the weighted mean value as regular distance data, and (iv) the fourth step of forming, using a shape data forming unit, shape data of the object to be measured on the basis of the position data which is detected by the position detection mechanism in the second step and represents the relative position between the point to be measured and the distance measuring device, and the regular distance data at the point to be measured extracted by the arithmetic processing unit in the third step.

In the shape measurement method of the present invention, the second step preferably includes the step of storing, in a data storage unit, the distance data to the point to be measured, which is measured by the distance measuring device, and the position data of the point to be measured, which is detected by the position detection mechanism.

In the shape measurement method of the present invention, the third step preferably includes the step of outputting one distance data as regular distance data from the arithmetic processing unit to the shape data forming unit when only the one distance data is obtained at each point to be measured.

Furthermore, in the shape measurement method of the present invention, the first step preferably includes the step of setting and changing, using the position setting/changing mechanism, the relative positional relationship between the object to be measured and the distance measuring device, and the third step includes the step of forming, using the shape data forming unit, three-dimensional data as the shape data of the object to be measured.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
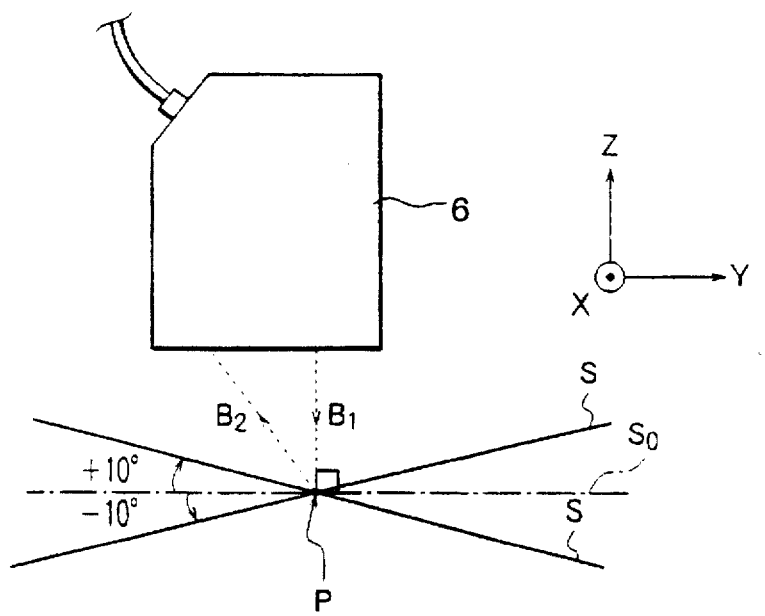
FIG. 1 is a schematic side view showing the surface to be measured which is obliquely set relative to a plane perpendicular to the optical axis of a laser displacement meter in a plane including irradiation light and reflected light of the laser displacement meter as the relative positional relationship between the laser displacement meter used in a shape measurement apparatus according to the first embodiment of the present invention and the surface to be measured.

The arrangements and operations of various embodiments associated with a shape measurement apparatus and method of the present invention will be described in detail below with reference to FIGS. 1 to 27. Note that the same reference numerals denote the same parts throughout the description of the drawings, and a repetitive description thereof will be omitted. Also, the dimensional ratios of the drawings do not always match those in the description.

First Embodiment

The measurement characteristics of a laser displacement meter as an example of an optical distance measuring device associated with a shape measurement apparatus of this embodiment will be described below.

Nowadays, various types of laser displacement meters are commercially available from various companies. These laser displacement meters have roughly the same measurement principles, device arrangements, and the like. The laser displacement meter used in this embodiment is one of these displacement meters, and has typical measurement characteristics.

Figure 2:
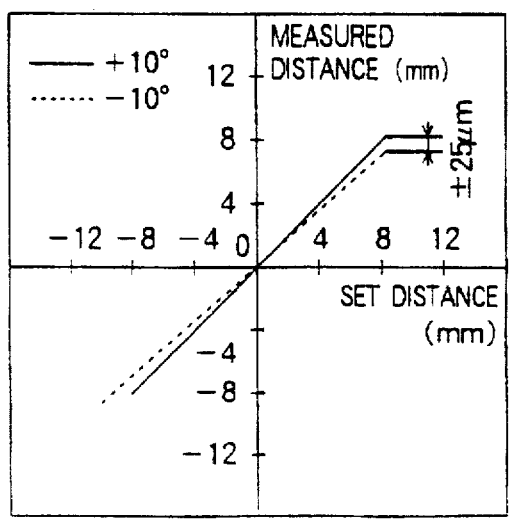
FIG. 2 is a graph showing the relationship between the setting values and the measurement values associated with the distance between the laser displacement meter and the points to be measured when the angle defined between the plane perpendicular to the optical axis of the laser displacement meter and the surface to be measured is set to be ±10° in FIG. 1.

FIG. 2 shows the measurement results of the distance between the irradiation unit of a laser displacement meter 6 and a point P to be measured on a surface S to be measured while the surface S to be measured is tilted relative to a plane $S_0$ perpendicular to the optical axis of the laser displacement meter 6 in the Y-Z plane including irradiation light $B_1$ and reflected light $B_2$ of the laser displacement meter 6, as the relative positional relationship between the laser displacement meter 6 and the surface S to be measured, as shown in FIG. 1. Note that the angle defined between the plane $S_0$ perpendicular to the optical axis of the laser displacement meter 6 and the surface S to be measured is set to be ±10°.

In FIG. 2, the measured distance values are compared with the distances set as the objects to be measured between the irradiation unit of the laser displacement meter 6 and the point P to be measured on the surface S to be measured when the angle defined between the optical axis of the laser displacement meter 6 and the surface S to be measured, i.e., the irradiation angle of the measurement light $B_1$, increases and decreases by ±10° from 90° in the Y-Z plane. As can be seen from FIG. 2, as the setting distance to be measured increases, the deviation amount between the setting distance and the measured distance, i.e., the measurement error tends to increase. For example, the measurement error for a setting distance of 0 mm is ±0 μm, but the measurement error for a setting distance of 8 mm reaches ±25 μm.

Figure 3:
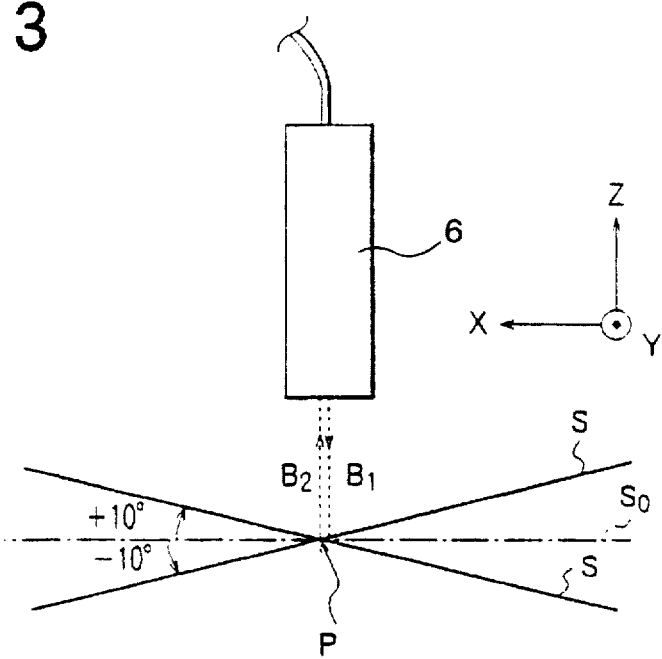
FIG. 3 is a schematic side view showing the surface to be measured which is obliquely set relative to a plane perpendicular to the optical axis of the laser displacement meter in a plane which is perpendicular to the plane including irradiation light and reflected light of the laser displacement meter and includes the optical axis of the laser displacement meter, as the relative positional relationship between the laser displacement meter used in the shape measurement apparatus according to the first embodiment of the present invention and the surface to be measured.
Figure 4:
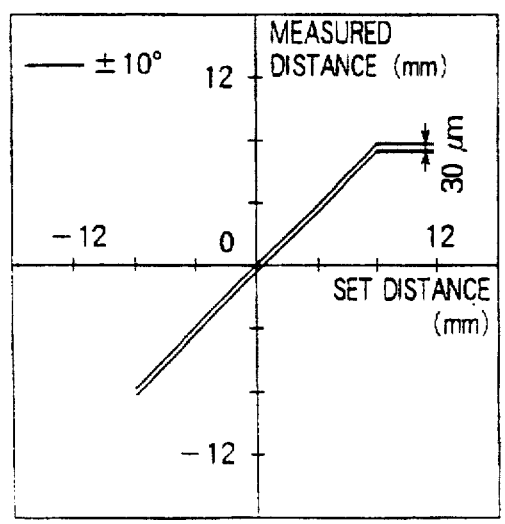
FIG. 4 is a graph showing the relationship between the setting values and the measurement values associated with the distance between the laser displacement meter and the points to be measured when the angle defined by the plane perpendicular to the optical axis of the laser displacement meter and the surface to be measured is set to be ±10° in FIG. 3.

Also, FIG. 4 shows the measurement results of the distance between the irradiation unit of the laser displacement meter 6 and the point P to be measured on the surface S to be measured while the surface S to be measured is tilted relative to the plane $S_0$ perpendicular to the optical axis of the laser displacement meter 6 in the X-Z plane which is perpendicular to the Y-Z plane including irradiation light $B_1$ and reflected light $B_2$ of the laser displacement meter 6 and includes the optical axis of the laser displacement meter 6, as the relative positional relationship between the laser displacement meter 6 and the surface S to be measured, as shown in FIG. 3. Note that the angle defined between the plane $S_0$ perpendicular to the optical axis of the laser displacement meter 6 and the surface S to be measured is set to be ±10°.

In FIG. 4, the measured distance values are compared with the distances set as the objects to be measured between the irradiation unit of the laser displacement meter 6 and the point P to be measured on the surface S to be measured when the angle defined between the optical axis of the laser displacement meter 6 and the surface S to be measured, i.e., the irradiation angle of the measurement light $B_1$, increases and decreases by ±10° from 90° in the X-Z plane. As can be seen from FIG. 4, the measurement errors as the displacement amounts between the setting distances and the measured distances are nearly constant irrespective of the setting distance to be measured. More specifically, the measurement error for any setting distance is constant, i.e., 30 μm.

As described above, in the non-contact type shape measurement method using an optical distance measuring device such as a laser displacement meter, since the optical distance measuring device can easily perpendicularly irradiate measurement light onto the object to be measured in shape measurements for an object to be measured having a two-dimensional shape, a high precision of the measured distance can be guaranteed. In contrast to this, in the shape measurements of an object to be measured having an arbitrary free curved surface, since oblique irradiation is performed, i.e., since the irradiation angle of the measurement light with respect to the object to be measured increases/decreases from 90°, the measured distance value includes measurement errors that cannot be ignored.

In view of this problem, the inventors of the present application found that a high precision of the measured distance can be guaranteed irrespective of the irradiation angle of the measurement light with respect to the object to be measured by eliminating or reducing measurement errors caused by the oblique irradiation of the measurement light in the non-contact type shape measurement method using an optical distance measuring device such as a laser displacement meter.

The principle of the measurement method that can remove or reduce measurement errors caused by oblique irradiation of the measurement light in the shape measurement apparatus of this embodiment will be explained below.

Figure 6:
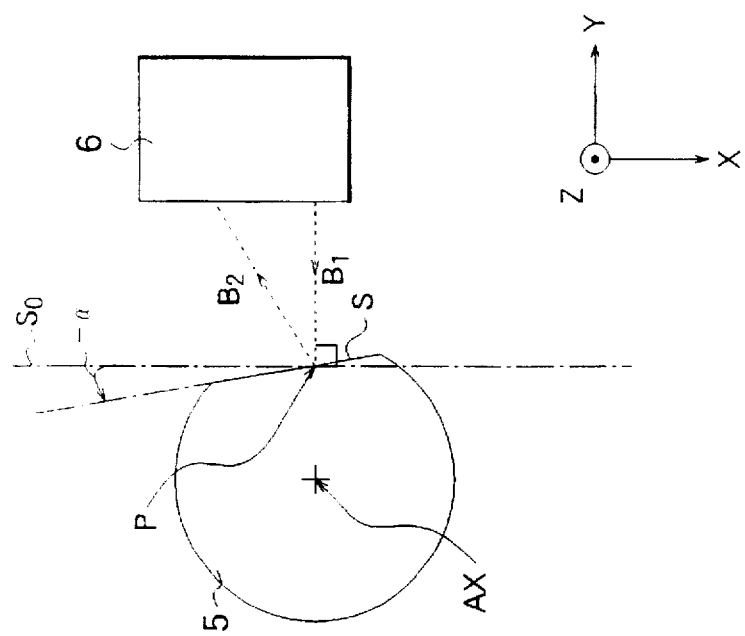
FIGS. 5 and 6 are plan views respectively showing the methods of eliminating measurement errors caused by oblique irradiation of measurement light as the principle of the present invention when the surface to be measured is tilted relative to a plane perpendicular to the optical axis of the laser displacement meter in a plane including the irradiation light and reflected light of the laser displacement meter.
Figure 5:
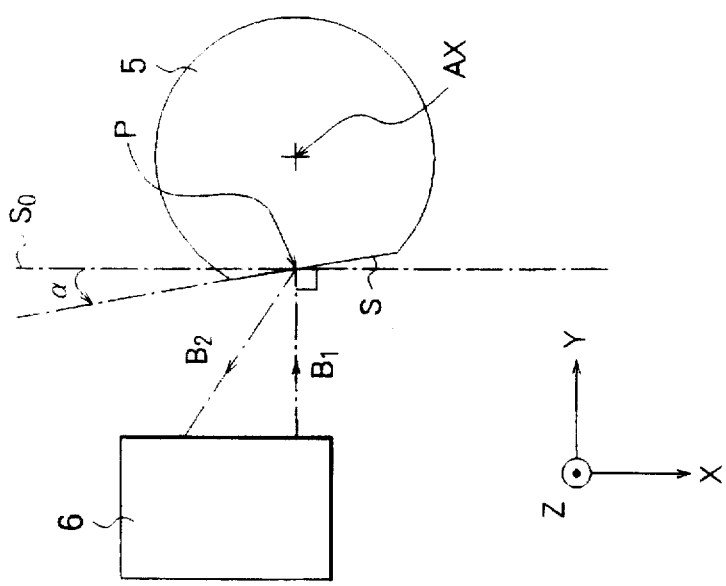

Assume that the distance between the irradiation unit of the laser displacement meter 6 and the point P to be measured on the surface S to be measured is measured when the surface S to be measured of an object 5 to be measured is tilted relative to the plane $S_0$ perpendicular to the optical axis of the laser displacement meter 6 in the X-Y plane including the irradiation light $B_1$ and reflected light $B_2$ of the laser displacement meter 6, as shown in FIGS. 5 and 6.

As shown in FIG. 5, a distance measurement is executed at the point P to be measured on the surface S to be measured which is not perpendicular to the light $B_1$ projected from the laser displacement meter 6 but is tilted through an angle a. The measured distance value obtained at that time is larger than the actual distance. Note that the tilt angle α of the surface S to be measured is an angle measured from the plane $S_0$ perpendicular to the optical axis of the laser displacement meter 6. Note that $0° \leq \alpha \leq 90°$.

Subsequently, as shown in FIG. 6, the object 5 to be measured is pivoted through 180° about a central axis AX of the object 5 to be measured parallel to the Z-axis direction, and the laser displacement meter 6 is moved to be symmetrical about the X-Z plane including the central axis AX of the object 5 to be measured. Thereafter, another distance measurement is executed at the point P to be measured on the surface S to be measured which is tilted through an angle −α with respect to the light $B_1$ projected from the laser displacement meter 6. The measured distance value obtained at that time is smaller than the actual distance. Note that the tilt angle −α of the surface S to be measured is an angle measured from the plane $S_0$ perpendicular to the optical axis of the laser displacement meter 6, and has the same absolute value as that of the tilt angle a in FIG. 5 in the opposite direction.

As a result, according to the distance measurements shown in FIGS. 5 and 6, distance measurements are performed with respect to the identical point P to be measured from two different directions which are set so that the angle defined between the plane $S_0$ perpendicular to the optical axis of the laser displacement meter 6 and the surface S to be measured becomes α and −α ($0° \leq \alpha \leq 90°$). For this reason, by averaging the measurement values obtained in these two different directions, the measurement errors included in the measured distance values can be canceled out.

Figure 7:
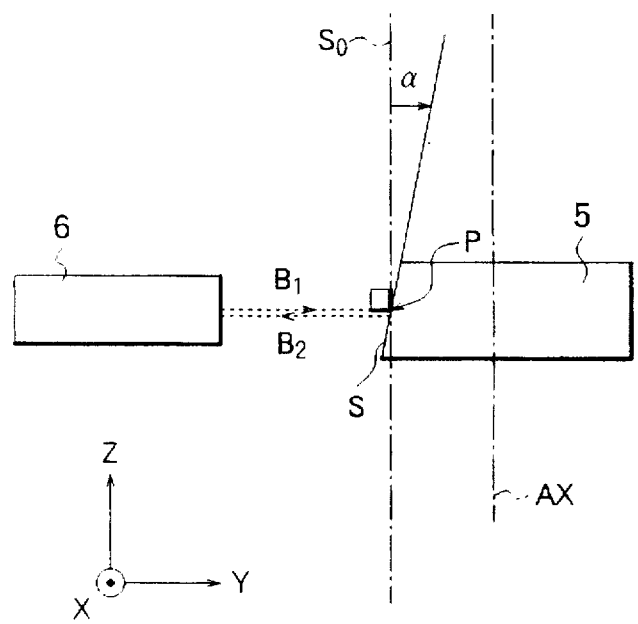
FIGS. 7 and 8 are plan views respectively showing the methods of eliminating measurement errors caused by oblique irradiation of measurement light as the principle of the present invention when the surface to be measured is tilted relative to a plane perpendicular to the optical axis of the laser displacement meter in a plane which is perpendicular to the plane including the irradiation light and reflected light of the laser displacement meter and includes the optical axis of the laser displacement meter.
Figure 8:
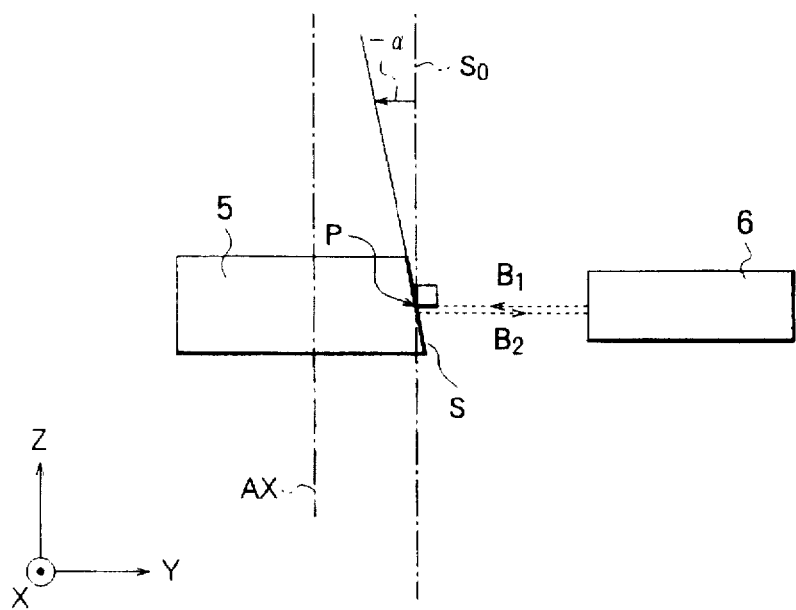

Also, assume that the distance between the irradiation unit of the laser displacement meter 6 and the point P to be measured on the surface S to be measured is measured when the surface S to be measured of the object 5 to be measured is tilted relative to the plane $S_0$ perpendicular to the optical axis of the laser displacement meter 6 in the Y-Z plane which is perpendicular to the X-Y plane including the irradiation light $B_1$ and reflected light $B_2$ of the laser displacement meter 6 and includes the optical axis of the laser displacement meter 6, as shown in FIGS. 7 and 8.

As shown in FIG. 7, a distance measurement is executed at the point P to be measured on the surface S to be measured which is not perpendicular to the light $B_1$ projected from the laser displacement meter 6 but is tilted through an angle $\alpha$. The measured distance value obtained at that time is larger than the actual distance. Note that the tilt angle $\alpha$ of the surface S to be measured is an angle measured from the plane $S_0$ perpendicular to the optical axis of the laser displacement meter 6. Note that $0° \leq \alpha \leq 90°$.

Subsequently, as shown in FIG. 8, the object 5 to be measured is pivoted through 180° about a central axis AX of the object 5 to be measured parallel to the Z-axis direction, and the laser displacement meter 6 is moved to be symmetrical about the X-Z plane including the central axis AX of the object 5 to be measured. Thereafter, another distance measurement is executed at the point P to be measured on the surface S to be measured which is tilted through an angle $-\alpha$ with respect to the light $B_1$ projected from the laser displacement meter 6. The measured distance value obtained at that time is smaller than the actual distance. Note that the tilt angle $-\alpha$ of the surface S to be measured is an angle measured from the plane $S_0$ perpendicular to the optical axis of the laser displacement meter 6, and has the same absolute value as that of the tilt angle $\alpha$ in FIG. 7 in the opposite direction.

As a consequence, according to the distance measurements shown in FIGS. 7 and 8, distance measurements are performed with respect to the identical point P to be measured from two different directions which are set so that the angle defined between the plane $S_0$ perpendicular to the optical axis of the laser displacement meter 6 and the surface S to be measured becomes $\alpha$ and $-\alpha$ ($0° \leq \alpha \leq 90°$). For this reason, by averaging the measurement values obtained in these two different directions, the measurement errors included in the measured distance values can be removed.

The tilt direction of the surface to be measured of an actual object to be measured is not limited to the directions shown in FIGS. 5 to 8, but may be arbitrarily set. However, the tilt, in the arbitrary direction, of the surface to be measured can be assumed to be the synthesized value of the tilts in the respective directions shown in FIGS. 5 to 8.

Therefore, since the shape measurement apparatus of this embodiment uses a position setting/changing mechanism for setting and changing the point to be measured by setting and changing the relative positional relationship between the optical distance measuring device (e.g., a laser displacement meter) and the object to be measured, distance measurements are performed while setting and changing the relative position between the optical distance measuring device and the object to be measured so that the angle defined between the optical axis of the optical distance measuring device and a predetermined identical point to be measured on the object to be measured having an arbitrary free curved surface becomes the above-mentioned $\alpha$ and $-\alpha$ ($0° \leq \alpha \leq 90°$).

More specifically, by setting at least two different irradiation angles of measurement light including the two different directions described in FIGS. 5 and 6 or FIGS. 7 and 8, distance measurements may be executed while setting and changing the relative position between the optical distance measuring device and the object to be measured. Alternatively, by setting at least four different irradiation angles of measurement light including the four different directions described in FIGS. 5 to 8, distance measurements may be executed while setting and changing the relative position between the optical distance measuring device and the object to be measured.

Note that the distance measurements at an identical point to be measured corresponding to a plurality of different irradiation angles of the measurement light may be executed for all the points to be measured on the object to be measured. However, such measurements may be executed for only the points to be measured, which especially require high distance measurement precision, on the object to be measured.

When the shape measurement apparatus of this embodiment uses an arithmetic processing unit which determines as a regular measured distance the average value of the measured distance values at a predetermined identical point to be measured obtained on the basis of the respective relative positions between the optical distance measuring device and the object to be measured, which are set in correspondence with the tilt directions of the surface to be measured, measurement errors included in measured distance data can be reduced or removed.

The arrangement of the overall shape measurement apparatus of the present invention will be described below.

Figure 9:
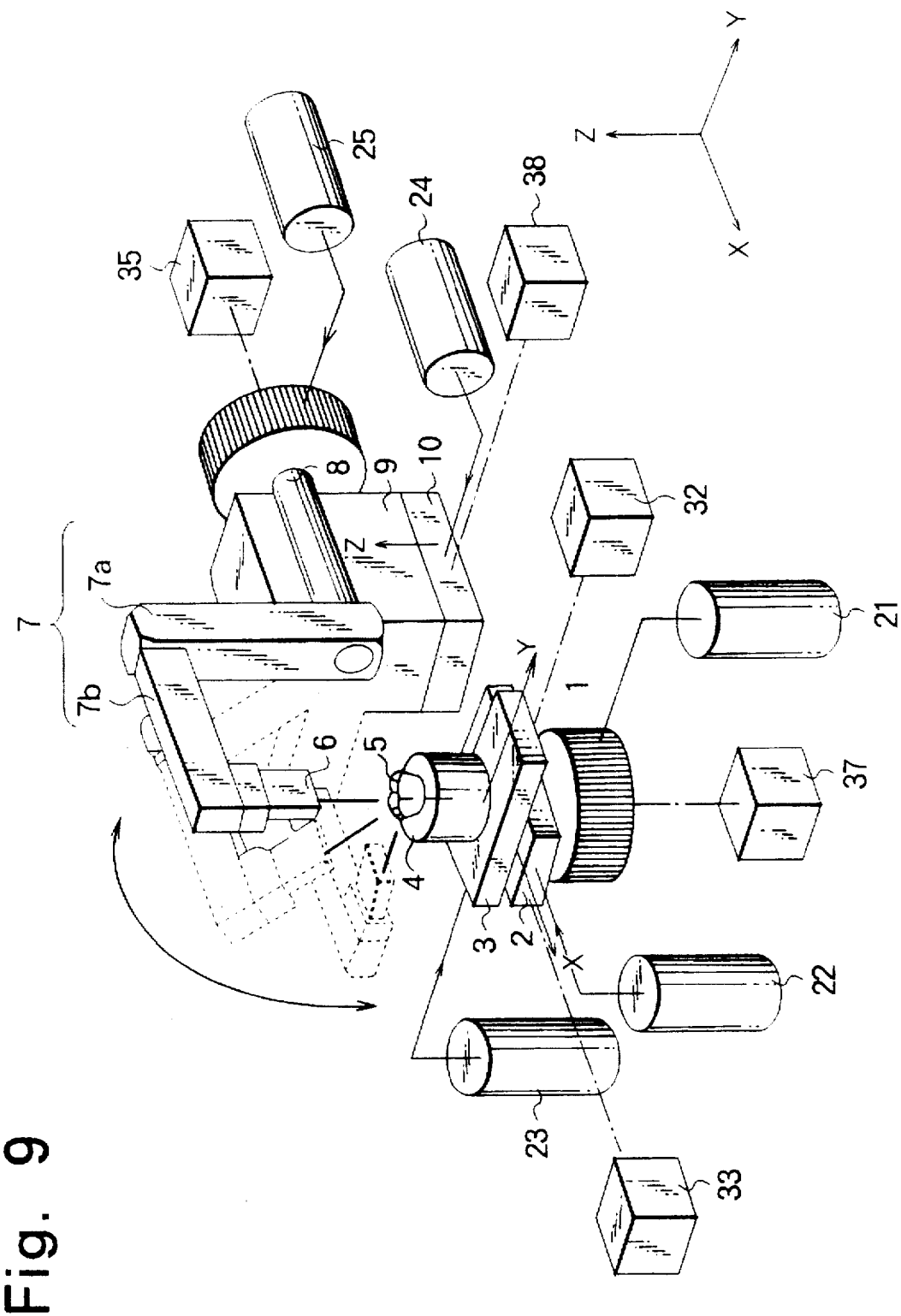
FIG. 9 is a schematic perspective view showing the arrangement of the shape measurement apparatus according to the first embodiment of the present invention.

As shown in FIG. 9, the shape measurement apparatus of this embodiment comprises a $\theta$ stage 1 attached on a main body board (not shown), an X stage 2 attained on the $\theta$ stage 1, a Y stage 3 attached on the X stage 2, and a holder 4 attached on the Y stage 3.

The $\theta$ stage 1 is pivoted about the Z-axis by a driving motor 21, and its position or rotation amount $\theta$ is detected by an encoder 31. The X stage 2 is moved along the X-axis direction by a driving motor 22, and its position or moving amount x is detected by an encoder 32. The Y stage 3 is moved along the Y-axis direction by a driving motor 23, and its position or moving amount y is detected by an encoder 33.

The holder 4 detachably holds the object 5 to be measured, and fixes it on the Y stage 3. The object 5 to be measured may be, e.g., a dental plaster model, as shown in FIG. 9, or may be other structural members. Note that the object 5 to be measured is movable in two directions, i.e., the X- and Y-axis directions and is rotatable in the X-Y plane with respect to the main body board by the three different stages 1 to 3.

Also, the shape measurement apparatus of this embodiment comprises a Z stage 10 attached on the main body board, a holding member 9 attained on the Z stage 10, a rotation shaft 8 supported by the holding member 9, an L-shaped arm 7 attached to be rotatable about the rotation shaft 8 as the central axis, and the laser displacement meter 6 attached to the distal end portion of the arm 7.

The Z stage 10 is moved along the Z-axis direction by a driving motor 24, and its position or moving amount z is detected by an encoder 34. The holding member 9 pivotally holds the rotation shaft 8, and is translated in the vertical direction by the Z stage 10. The rotation shaft 8 is pivoted about the X-axis by a driving motor 25, and its position or rotation amount $\beta$ is detected by an encoder 35.

The arm 7 is constituted by an arm base portion 7a which is attached to the distal end portion of the rotation shaft 8 and rotates in the Y-Z plane, and an arm end portion 7b attached to the distal end portion of the base portion 7a along the X-axis direction, and holds the laser displacement meter 6. Note that the laser displacement meter 6 is movable along the Z-axis by the Z stage 10, and is rotatable in the Y-Z plate by the arm 7.

The laser displacement meter 6 rotates about the X-axis by the arm 7 around the object 5 to be measured fixed to the holder 4. The laser displacement meter 6 irradiates measurement light from its irradiation unit onto the object 5 to be measured, and detects light reflected by the object 5 to be measured by its light-receiving unit, thereby measuring the distance between the irradiation unit and the object 5 to be measured.

In the laser displacement meter 6, the irradiation unit and the light-receiving unit are arranged along the X-axis direction. The irradiation unit preferably comprises a light source such as an He—Ne gas laser. On the other hand, the light-receiving unit preferably comprises a photodetector such as a CCD (Charge Coupled Device), a PSD (Position Sensitive Device), or the like as a linear sensor.

Note that the laser displacement meter 6 detects the reflection angle of the measurement light in correspondence with the incident position of the measurement light reflected by the object 5 to be measured, and calculates the three-dimensional coordinate position of the point to be measured as the laser spot position on the object 5 to be measured by the trigonometrical measurement method on the basis of the distance between the central position of the irradiation unit and the detection position of the light-receiving unit.

Therefore, in this embodiment, the θ stage 1, X stage 2, Y stage 3, Z stage 10, arm 7, rotation shaft 8, holding member 9, and five driving motors 21 to 25 constitute a position setting/changing mechanism, which sets and changes the relative positional relationship between the laser displacement meter 6 and the object 5 to be measured, thereby setting and changing the point to be measured on the object 5 to be measured. The five encoders 31 to 35 constitute a position detection mechanism, which measures the relative positional relationship between the laser displacement meter 6 and the object 5 to be measured, thereby detecting the position of the point to be measured on the object 5 to 5 be measured.

Figure 10:
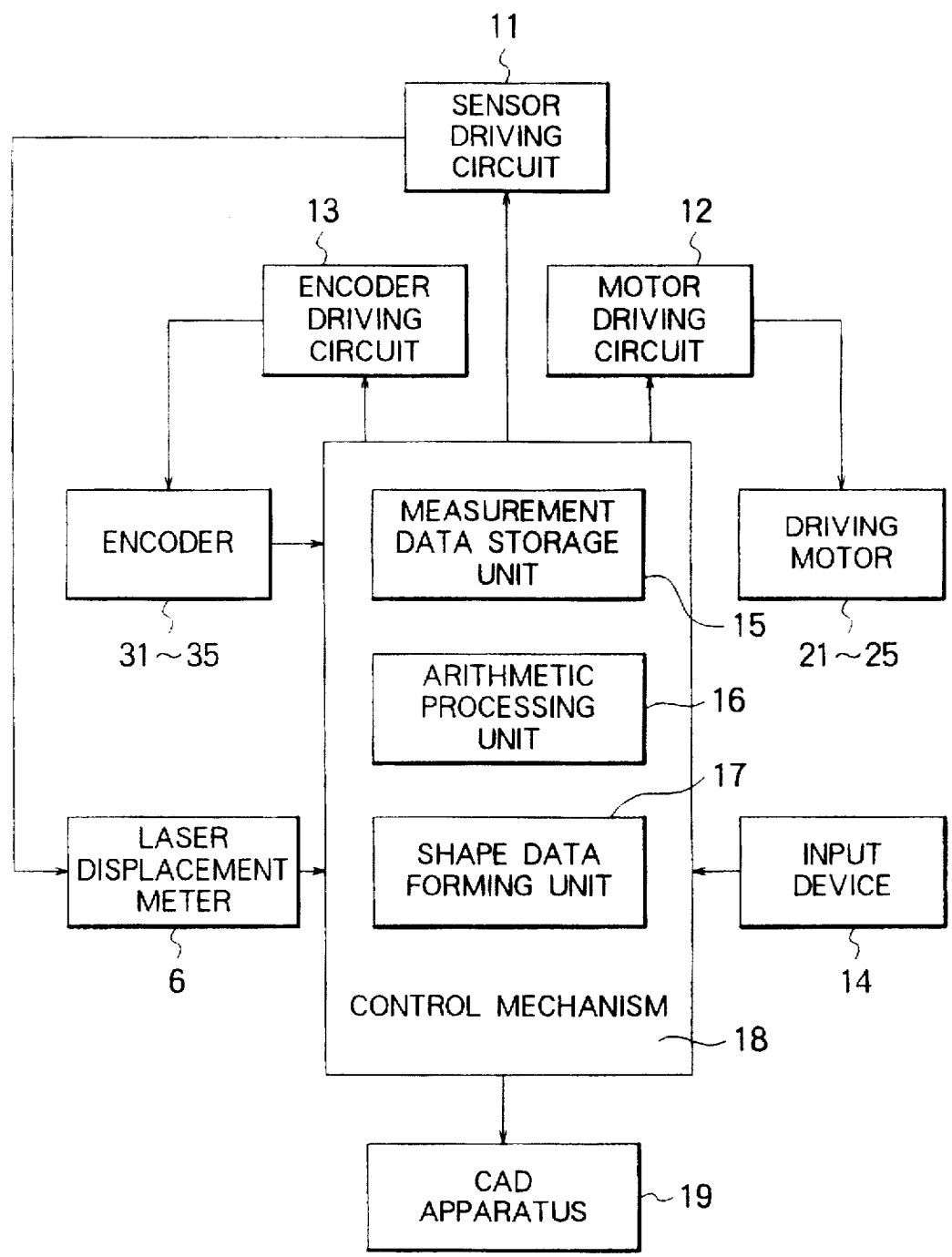
FIG. 10 is a schematic block diagram showing the arrangement of a control system in the shape measurement apparatus shown in FIG. 9.

Furthermore, as shown in FIG. 10, the shape measurement apparatus of this embodiment comprises a motor driving circuit 12 for driving the five driving motors 21 to 25, a sensor driving circuit 11 for driving the laser displacement meter 6, an encoder driving circuit 13 for driving the five encoders 31 to 35, a control mechanism 18 for controlling the operations of the three different driving circuits 11 to 13, and an input device 14 which is used by a measurement person to input various kinds of commands to the control mechanism 18.

The control mechanism 18 comprises a microcomputer that incorporates a CPU (Central Processing Unit), a memory, and the like, and controls the three different driving circuits 11 to 13 on the basis of various commands input by the measurement person via the input device 14 comprising, e.g., a keyboard or the like, thereby executing shape measurements of the object 5 to be measured. More specifically, the motor driving circuit 12 operates the position setting/changing mechanism including the five driving motors 21 to 25 on the basis of control signals input from the control mechanism 18, thereby setting and changing the relative positional relationship between the laser displacement meter 6 and the object 5 to be measured.

The encoder driving circuit 13 operates the five encoders 31 to 35 as the position detection mechanism on the basis of control signals input from the control mechanism 18, and the five encoders 31 to 35 output position data indicating the relative positions of the laser displacement meter 6 and the object 5 to be measured to the control mechanism. The sensor driving circuit 11 operates the laser displacement meter 6 on the basis of control signals input from the control mechanism 18, and the laser displacement meter 6 outputs distance data representing the distance between the laser displacement meter 6 and the object 5 to be measured to the control mechanism 18.

The control mechanism 18 comprises a measurement data storage unit 15 for storing the distance data and position data of the object 5 to be measured in a memory, an arithmetic processing unit 16 for performing averaging processing for the distance data stored in the memory, and a shape data forming unit 17 for forming shape data of the object 5 to be measured on the basis of the distance data that have been subjected to the averaging processing, and the position data.

The control mechanism 18 with the above arrangement has the following four functions:

(i) the function of the measurement data storage unit 15: a function of storing the distance data at the respective points to be measured, which are measured by the laser displacement meter 6, and the position data of the respective points to be measured, which are measured by the five encoders 31 to 35, in the memory;

(ii) the function of the arithmetic processing unit 16: a function of averaging the distance data at the respective points to be measured stored in the memory by the measurement data storage unit 15 in correspondence with at least two different irradiation angles of measurement light onto the object 5 to be measured;

(iii) the function of the shape data forming unit 17: a function of generating two- or three-dimensional data of the object 5 to be measured on the basis of the distance data and the position data at the respective points to be measured, which are stored in the memory after the averaging processing of the arithmetic processing unit 16; and (iv) the function of the central control processing: a function of controlling the operations of the sensor driving circuit 11, motor driving circuit 12, encoder driving circuit 13, measurement data storage unit 15, arithmetic processing unit 16, and shape data forming unit 17.

The shape measurement apparatus of this embodiment supplies the shape data of the object 5 to be measured, which is generated by the control mechanism 18, to a CAD (Computer Aided Design) apparatus 19. The CAD apparatus 19 reproduces and displays the two- or three-dimensional image of the object 5 to be measured on the basis of the shape data of the object 5 to be measured, or processes the shape data for the purpose of aiding designing.

The operation for removing or reducing measurement errors caused by oblique irradiation of measurement light will be explained below.

Figure 11:
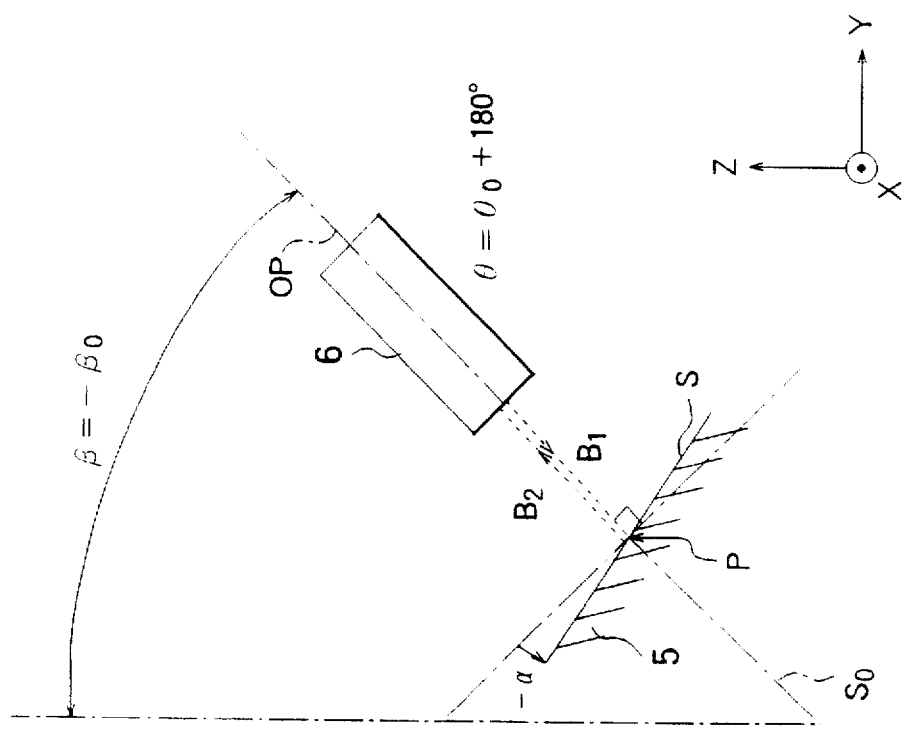
FIGS. 11 and 12 are side views respectively showing the methods of executing distance measurements with respect to an identical point to be measured on the basis of oblique irradiation of measurement light when the surface to be measured is tilted relative to a plane perpendicular to the optical axis of a laser displacement meter in a plane which is perpendicular to a plane including the irradiation light and reflected light of the laser displacement meter and includes the optical axis of the laser displacement meter in the shape measurement apparatus shown in FIG. 9.
Figure 12:
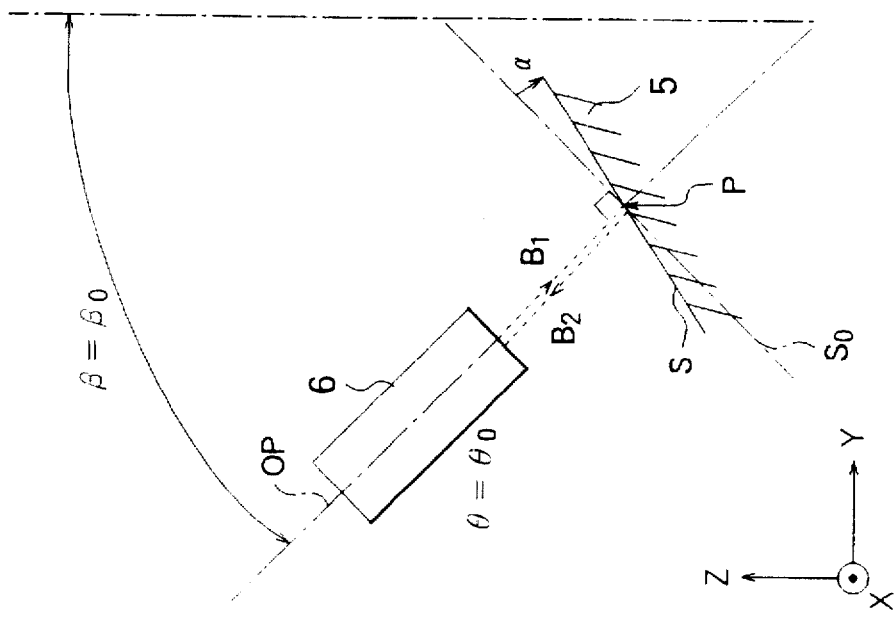

For example, assume that the distance and the relative position between the irradiation unit of the laser displacement meter 6 and the point P to be measured on the surface S to be measured are measured when the surface S to be measured of the object 5 to be measured is tilted relative to the plane $S_0$ perpendicular to the optical axis OP of the laser displacement meter 6 in the plane which is perpendicular to the plane including the irradiation light $B_1$ and reflected light $B_2$ of the laser displacement meter 6 and includes the optical axis OP of the laser displacement meter 6, as shown in FIGS. 11 and 12.

First, when the object 5 to be measured is set in correspondence with the position $\theta=\theta_0$ of the θ stage 1, and the laser displacement meter 6 is set in correspondence with the position $\beta=\beta_0$ of the arm 7, as shown in FIG. 11, the control mechanism 18 executes measurements of the distance and position at the point P to be measured on the surface S to be measured tilted through the angle a with respect to the light $B_1$ projected from the laser displacement meter 6 using the laser displacement meter 6 and the five encoders 31 to 35.

Subsequently, as shown in FIG. 12, the control mechanism 18 sets the object 5 to be measured in correspondence with the position $\theta=\theta_0+180°$ of the $\theta$ stage 1 and sets the laser displacement meter 6 in correspondence with the position $\beta=\beta_0$ of the arm 7 by pivoting the $\theta$ stage 1 through 180° about the Z-axis, and rotating the arm 7 through the angle $2\beta_0$ via the reference angle $\beta=0°$ about the X-axis. Thereafter, the control mechanism 18 executes measurements of the distance and position at the point P to be measured on the surface S to be measured tilted through the angle $-\alpha$ with respect to the light $B_1$ projected from the laser displacement meter 6 using the laser displacement meter 6 and the five encoders 31 to 35.

As a result, the control mechanism 18 stores the distance data and position data measured with respect to the identical point P to be measured from the two different directions, which are set so that the angle defined between the plane $S_0$ perpendicular to the optical axis of the laser displacement meter 6 and the surface S to be measured becomes $\alpha$ and $-\alpha$ ($0°\leq\alpha\leq 90°$). The control mechanism 18 averages the two measurement values obtained in the two different directions in association with the identical point P to be measured, thereby canceling out measurement errors included in the measured distance value.

Figure 13:
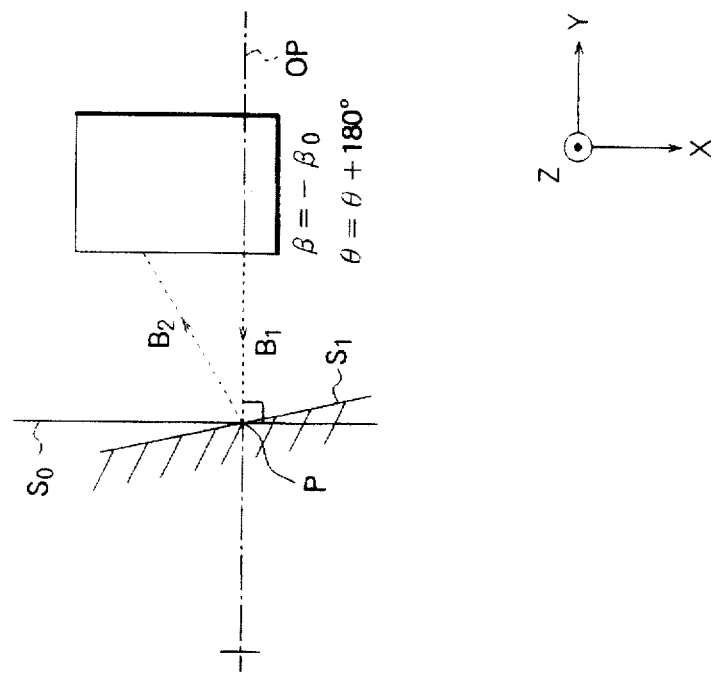
FIGS. 13 and 14 are plan views respectively showing the methods of executing distance measurements with respect to an identical point to be measured on the basis of oblique irradiation of measurement light when the surface to be measured is tilted relative to the plane perpendicular to the optical axis of the laser displacement meter in the plane including the irradiation light and reflected light of the laser displacement meter in the shape measurement apparatus shown in FIG. 9.
Figure 14:
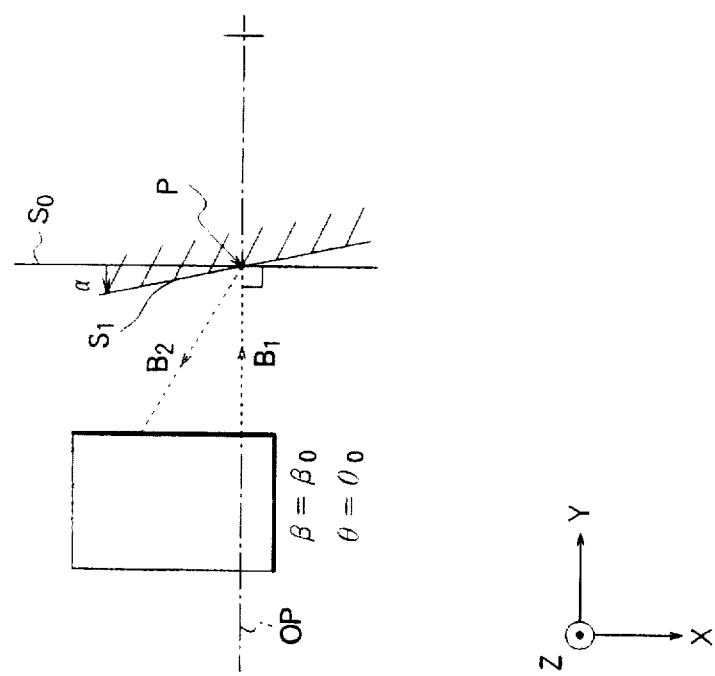

Also, assume that the distance and the relative position between the irradiation unit of the laser displacement meter 6 and the point P to be measured on the surface S to be measured are measured when the surface S to be measured of the object 5 to be measured is tilted relative to the plane $S_0$ perpendicular to the optical axis OP of the laser displacement meter 6 in the plane including the irradiation light $B_1$ and reflected light $B_2$ of the laser displacement meter 6, as shown in FIGS. 13 and 14.

When the object 5 to be measured is set in correspondence with the position $\theta=\theta_0$ of the $\theta$ stage 1, and the laser displacement meter 6 is set in correspondence with the position $\beta=\beta_0$ of the arm 7, as shown in FIG. 13, the control mechanism 18 executes measurements of the distance and position at the point P to be measured on the surface S to be measured tilted through the angle a with respect to the light $B_1$ projected from the laser displacement meter 6 using the laser displacement meter 6 and the five encoders 31 to 35.

Subsequently, as shown in FIG. 14, the control mechanism 18 sets the object 5 to be measured in correspondence with the position $\theta=\theta_0+180°$ of the $\theta$ stage 1 and sets the laser displacement meter 6 in correspondence with the position $\beta=\beta_0$ of the arm 7 by pivoting the $\theta$ stage 1 through 180° about the Z-axis, and rotating the arm 7 through the angle $2\beta_0$ via the reference angle $\beta=0°$ about the X-axis. Thereafter, the control mechanism 18 executes measurements of the distance and position at the point P to be measured on the surface S to be measured tilted through the angle $-\alpha$ with respect to the light $B_1$ projected from the laser displacement meter 6 using the laser displacement meter 6 and the five encoders 31 to 35.

As a result, the control mechanism 18 stores the distance data and position data measured with respect to the identical point P to be measured from the two different directions, which are set so that the angle defined between the plane $S_0$ perpendicular to the optical axis of the laser displacement meter 6 and the surface S to be measured becomes $\alpha$ and $-\alpha$ ($0°\leq\alpha\leq 90°$). The control mechanism 18 averages the two measurement values obtained in the two different directions in association with the identical point P to be measured, thereby removing measurement errors included in the measured distance value.

The method of measuring the shape of an object to be measured having an arbitrary free curved surface as the operation of the shape measurement apparatus of this embodiment will be described below with reference to FIGS. 15 to 19.

In step 100, when the object 5 to be measured is a dental plaster model shown in FIG. 9, the positions to be measured for measuring the shape of this dental plaster model are the occlusal surface of teeth and the side surface. An operator fixes the object 5 to be measured to the holder 4, so that the surface which need not be measured of the object 5 to be measured faces down. Note that FIG. 9 illustrates only one of a plurality of teeth that constitute the dental plaster model as the object 5 to be measured.

Thereafter, the operator supplies an initialization command to the control mechanism 18 by operating the input device 14, thereby initializing the relative positional relationship between the laser displacement meter 6 and the object 5 to be measured. Then, the control mechanism 18 controls the motor driving circuit 12 on the basis of the command from the input device 14, thus driving the position setting/changing mechanism.

More specifically, the control mechanism 18 sets the angle $\beta$ of the arm 7, so that the optical axis of the laser displacement meter 7 extends perpendicularly to the X-Y plane. Thereafter, the control mechanism 18 sets the height z of the Z stage 10, so that the object 5 to be measured falls within the focal depth of a light-receiving lens included in the light-receiving unit of the laser displacement meter 6, and also sets the positions x and y of the X and Y stages 2 and 3, so that the object 5 to be measured is located within the irradiation range of the measurement light as the measurement range of the laser displacement meter 6. Thereafter, the processing of the control mechanism 18 advances to step 102.

Subsequently, in step 102, the control mechanism 18 controls the motor driving circuit 12 to drive the driving motor 25, thereby setting the angle $\beta$ of the arm 7, so that the optical axis of the laser displacement meter 6 extends perpendicularly to the X-Z plane. The processing of the control mechanism 18 advances to step 104.

In step 104, the operator inputs a measurement start command to the control mechanism 18 by operating the input device 14, thereby executing measurements of the distance and the relative position between the laser displacement meter 6 and the object 5 to be measured. Hence, the control mechanism 18 controls the motor driving circuit 12 to drive the driving motor 21, thus starting pivotal motion of the 6 stage 1 about the Z-axis. The processing of the control mechanism 18 then advances to step 106.

In step 106, the control mechanism 18 controls the sensor driving circuit 11 and the encoder driving circuit 13 to drive the laser displacement meter 6 and the five encoders 31 to 35, thereby executing first measurements of the distance and position of the point to be measured corresponding to a predetermined angular interval about the Z-axis on the side surface of the object 5 to be measured. The processing of the control mechanism 18 advances to step 108.

In step 108, the control mechanism 18 controls the measurement data storage unit 15 to store the distance data and position data at the point to be measured input from the laser displacement meter 6 and the five encoders 31 to 35 in the memory. The processing of the control mechanism 18 advances to step 110.

Subsequently, in step 110, the control mechanism 18 checks based on the position data of the $\theta$ stage 1 input from the encoder 31 if one revolution (360°) of the θ stage 1 has been completed since step 104. If one revolution of the θ stage 1 has not been completed yet, the processing of the control mechanism 18 returns to step 106. On the other hand, one revolution of the θ stage 1 has been completed, the processing of the control mechanism 18 advances to step 112.

In step 112, the control mechanism 18 controls the motor driving circuit 12 to stop the driving motor 21 and to end the pivotal motion of the θ stage 1 about the Z-axis. The processing of the control mechanism 18 advances to step 114.

In step 114, the control mechanism 18 checks based on the position data of the Z stage 10 input from the encoder 34 if the upward movement of the Z stage 10 within the predetermined moving range has been completed. If the upward movement of the Z stage 10 has not been completed yet, the processing of the control mechanism 18 advances to step 116. On the other hand, if the upward movement of the Z stage 10 within the predetermined moving range has been completed, the processing of the control mechanism 18 advances to step 118.

In step 116, the control mechanism 18 controls the motor driving circuit 12 to drive the driving motor 24, thereby raising the Z stage 10 by a predetermined amount in the Z-axis direction. The processing of the control mechanism 18 returns to step 104.

In step 118, the control mechanism 18 controls the motor driving circuit 12 to drive the driving motor 21, thus starting pivotal motion of the θ stage 1 about the Z-axis. The processing of the control mechanism 18 advances to step 120.

In step 120, the control mechanism 18 controls the sensor driving circuit 11 and the encoder driving circuit 13 to drive the laser displacement meter 6 and the five encoders 31 to 35, thus executing first measurements of the distance and position at the point to be measured corresponding to the predetermined angular interval about the Z-axis on the shoulder surface and upper surface of the object 5 to be measured. The processing of the control mechanism 18 advances to step 122.

In step 122, the control mechanism 18 controls the measurement data storage unit 15 to store the distance data and position data at the point to be measured input from the laser displacement meter 6 and the five encoders 31 to 35 in the memory. The processing of the control mechanism 18 advances to step 124.

In step 124, the control mechanism 18 checks based on the position data of the θ stage 1 input from the encoder 31 if one revolution (360°) of the θ stage 1 has been completed since step 118. If one revolution of the θ stage 1 has not been completed yet, the processing of the control mechanism 18 returns to step 120. On the other hand, one revolution of the θ stage 1 has been completed, the processing of the control mechanism 18 advances to step 126.

In step 126, the control mechanism 18 controls the motor driving circuit 12 to stop the driving motor 21, thereby ending the pivotal motion of the θ stage 1 about the Z-axis. The processing of the control mechanism 18 advances to step 128.

In step 128, the control mechanism 18 checks based on the position data of the arm 7 input from the encoder 35 if the upward movement of the arm 7 within the predetermined moving range has been completed. If the upward movement of the arm 7 within the predetermined moving range has not been completed yet, the processing of the control mechanism 18 advances to step 130. On the other hand, if the upward movement of the arm 7 within the predetermined moving range has been completed, i.e., if the optical axis of the laser displacement meter 6 extends perpendicularly to the X-Y plane, the processing of the control mechanism 18 advances to step 132.

In step 130, the control mechanism 18 controls the motor driving circuit 12 to drive the driving motor 25, so that the arm 7 rotates about the X-axis and moves upward by a predetermined amount. The processing of the control mechanism 18 returns to step 118.

In step 132, the control mechanism 18 controls the motor driving circuit 12 to drive the driving motor 21, thereby starting pivotal motion of the θ stage 1 about the Z-axis. The processing of the control mechanism 18 advances to step 134.

Subsequently, in step 134, the control mechanism 18 controls the sensor driving circuit 11 and the encoder driving circuit 13 to drive the laser displacement meter 6 and the five encoders 31 to 35, thus executing second measurements of the distance and position at the point to be measured corresponding to the predetermined angular interval about the Z-axis on the shoulder surface and upper surface of the object 5 to be measured. The processing of the control mechanism 18 advances to step 136.

In step 136, the control mechanism 18 controls the measurement data storage unit 15 to store the distance data and position data at the point to be measured input from the laser displacement meter 6 and the five encoders 31 to 35 in the memory. The processing of the control mechanism 18 advances to step 138.

In step 138, the control mechanism 18 checks based on the position data of the θ stage 1 input from the encoder 31 if one revolution (360°) of the θ stage 1 has been completed since step 132. If one revolution of the θ stage 1 has not been completed yet, the processing of the control mechanism 18 returns to step 134. On the other hand, one revolution of the θ stage 1 has been completed, the processing of the control mechanism 18 advances to step 140.

In step 140, the control mechanism 18 controls the motor driving circuit 12 to stop the driving motor 21, thus ending the pivotal motion of the θ stage 1 about the Z-axis. The processing of the control mechanism 18 advances to step 142.

Subsequently, in step 142, the control mechanism 18 checks based on the position data of the arm 7 input from the encoder 35 if the downward movement of the arm 7 within the predetermined moving range has been completed. If the downward movement of the arm 7 within the predetermined moving range has not been completed yet, the processing of the control mechanism 18 advances to step 144. On the other hand, if the downward movement of the arm 7 within the predetermined moving range has been completed, i.e., the optical axis of the laser displacement meter 6 extends perpendicularly to the X-Z plane, the processing of the control mechanism 18 advances to step 146.

In step 144, the control mechanism 18 controls the motor driving circuit 12 to drive the driving motor 25, so that the arm 7 rotates about the X-axis and moves downward by a predetermined amount. The processing of the control mechanism 18 returns to step 132.

In step 146, the control mechanism 18 controls the motor driving circuit 12 to drive the driving motor 21, thereby starting pivotal motion of the θ stage 1 about the Z-axis. The processing of the control mechanism 18 returns to step 148.

In step 148, the control mechanism 18 controls the sensor driving circuit 11 and the encoder driving circuit 13 to drive the laser displacement meter 6 and the five encoders 31 to 35, thus executing second measurements of the distance and position at the point to be measured corresponding to the predetermined angular interval about the Z-axis on the side surface of the object 5 to be measured. The processing of the control mechanism 18 advances to step 150.

In step 150, the control mechanism 18 controls the measurement data storage unit 15 to store the distance data and position data at the point to be measured input from the laser displacement meter 6 and the five encoders 31 to 35 in the memory. The processing of the control mechanism 18 advances to step 152.

In step 152, the control mechanism 18 checks based on the position data of the θ stage 1 input from the encoder 31 if one revolution (360°) of the θ stage 1 has been completed since step 146. If one revolution of the θ stage 1 has not been completed yet, the processing of the control mechanism 18 returns to step 154. On the other hand, one revolution of the θ stage 1 has been completed, the processing of the control mechanism 18 returns to step 148.

In step 154, the control mechanism 18 controls the motor driving circuit 12 to stop the driving motor 21 thus ending the pivotal motion of the θ stage 1 about the Z-axis. The processing of the control mechanism 18 advances to step 156.

In step 156, the control mechanism 18 checks based on the position data of the Z stage 10 input from the encoder 34 if the downward movement of the Z stage 10 within the predetermined moving range has been completed. If the downward movement of the Z stage 10 within the predetermined moving range has not been completed yet, the processing of the control mechanism 18 advances to step 158. On the other hand, if the downward movement of the Z stage 10 within the predetermined moving range has been completed, the processing of the control mechanism 18 advances to step 160.

In step 158, the control mechanism 18 controls the motor driving circuit 12 to drive the driving motor 24, thereby lowering the Z stage 1 by a predetermined amount in the Z-axis direction. The processing of the control mechanism 18 returns to step 146.

In step 160, the control mechanism 18 controls the arithmetic processing unit 16 to average at least two different distance data obtained at the identical point to be measured on the side surface of the object 5 to be measured stored in the memory, i.e., average a plurality of different distance data corresponding to the angles α and −α ($0° \leq \alpha \leq 90°$) defined between the plane perpendicular to the optical axis of the laser displacement meter 6 and the surface to be measured. The processing of the control mechanism 18 advances to step 162.

In step 162, the control mechanism 18 controls the arithmetic processing unit 16 to average at least two different distance data obtained at the identical point to be measured on the shoulder surface and upper surface of the object 5 to be measured stored in the memory, i.e., average a plurality of different distance data corresponding to the angles α and −α ($0° \leq \alpha \leq 90°$) defined between the plane perpendicular to the optical axis of the laser displacement meter 6 and the surface to be measured. The processing of the control mechanism 18 advances to step 164.

Subsequently, in step 164, the control mechanism 18 controls the measurement data storage unit 15 to re-store the averaged distance data at the point to be measured in the memory as regular distance data. The processing of the control mechanism 18 advances to step 166.

Finally, in step 166, the control mechanism 18 controls the shape data forming unit 17 to form two- or three-dimensional shape data of the object 5 to be measured on the basis of the distance data and position data of all the points to be measured on the side surface, shoulder surface, and upper surface of the object 5 to be measured, which are re-stored in the memory, and outputs the formed shape data to the CAD apparatus 19. The CAD apparatus 19 displays or processes information associated with the two- or three-dimensional shape of the object 5 to be measured on the basis of the shape data input from the control mechanism 18, or executes various kinds of image processing, and the like.

Second Embodiment

The measurement characteristics of a laser displacement meter as an example of an optical distance measuring device associated with a shape measurement apparatus of this embodiment will be described below.

Figure 20:
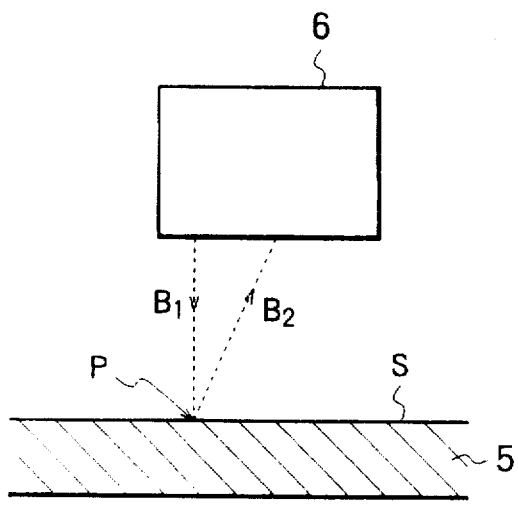
FIGS. 20 and 21 are side views respectively showing the optical paths of measurement light on the basis of the reflection directions corresponding to the shape of the surface to be measured in a shape measurement apparatus according to the second embodiment of the present invention.

As shown in FIG. 20, when a surface S to be measured of an object 5 to be measured is nearly flat, the tilt angle a plane perpendicular to the optical axis of a laser displacement meter 6 makes with the surface S to be measured does not change largely, and hence, the angles the optical paths of irradiation light $B_1$ and reflected light $B_2$ of the laser displacement meter 6 make do not change abruptly, either. For this reason, as has been described in the first embodiment, a high precision of the measured distance at the point to be measured on the surface S to be measured is guaranteed.

Figure 21:
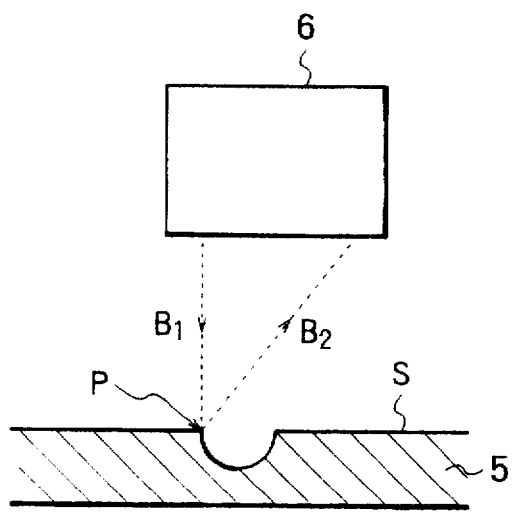

However, as shown in FIG. 21, when the surface S to be measured of the object 5 to be measured includes a three-dimensional portion, i.e., an irregular portion, the tilt angle the plane perpendicular to the optical axis of the laser displacement meter 6 makes with the surface S to be measured largely changes on the boundary region of the three-dimensional portion on the surface S to be measured. As a result, the angle the optical paths of the irradiation light $B_1$ and reflected light $B_2$ of the laser displacement meter 6 make may often change abruptly. For this reason, as has been described in the first embodiment, the measured distance value at the point to be measured on the surface S to be measured may often include measurement errors that cannot be ignored.

The inventors of the present application found that a high precision of the measured distance can be guaranteed irrespective of the irradiation angle of the measurement light with respect to the object to be measured by removing or reducing measurement errors caused by oblique irradiation of the measurement light in the non-contact type shape measurement method using an optical distance measuring device such as a laser displacement meter.

The principle of the measurement method that can remove or reduce measurement errors caused by oblique irradiation of the measurement light in the shape measurement apparatus of this embodiment will be explained below.

Upon measuring the shape of an object to be measured having an arbitrary free curved surface, distance measurements for the identical point to be measured are performed twice or a plurality of number of times equal to or larger than two with respect to the predetermined surface to be measured of the object to be measured, for example, the surface to be measured that requires high distance measurement precision, the surface to be measured that includes many points to be measured which are tilted so that the irradiation angle of the measurement light largely deviates from 90°, and the like. The plurality of distance measurements for the identical point to be measured are attained by changing the relative positional relationship between the object to be measured and the optical distance measuring device.

As a result, distance measurements are performed for the identical point to be measured from a plurality of different directions, which are set so that the angle defined between the plane perpendicular to the optical axis of the laser displacement meter and the surface to be measured includes a plurality of different angles including, e.g., $\alpha$ and $-\alpha$ ($0 \leq \alpha \leq 90°$), as has been described in the first embodiment. For this reason, by selecting or averaging the plurality of measurement values obtained in these directions, measurement errors included in the measured distance values can be canceled out.

Figure 22:
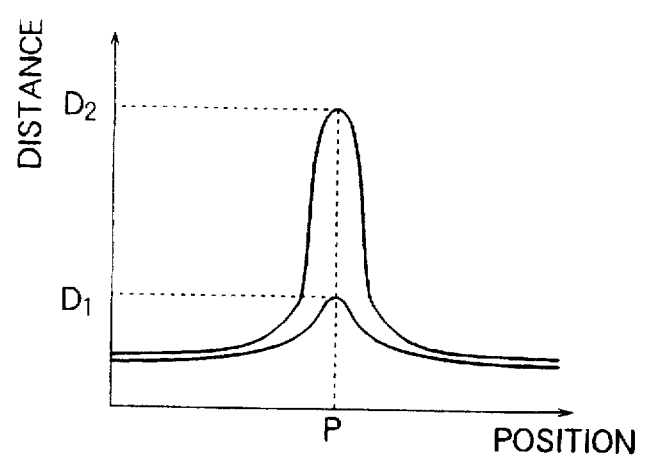
FIG. 22 is a graph showing the distance data distribution of the points to be measured obtained as a result of measurements of a laser displacement meter in the shape measurement apparatus shown in FIGS. 20 and 21.
Figure 23:
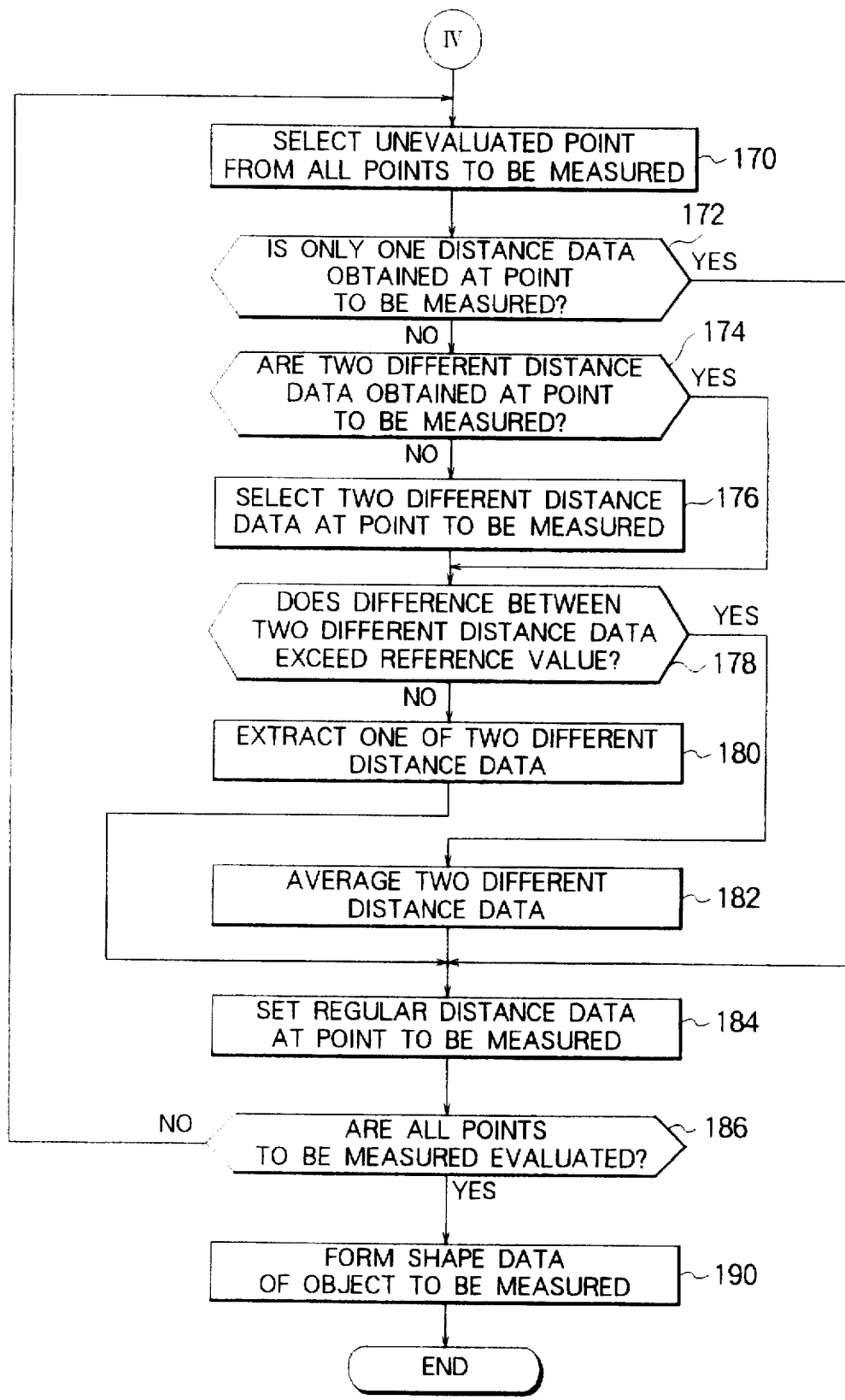
FIG. 23 is a flow chart showing, in turn, the operation procedures in the shape measurement apparatus according to the second embodiment of the present invention.

For example, as shown in FIG. 22, when two distance data $D_1$ and $D_2$ are obtained as a plurality of measured distance values at a point P to be measured, it is checked if the difference $|D_1-D_2|$ between these two distance data $D_1$ and $D_2$ exceeds a reference value $D_0$. In this case, if there are two or more distance data as the measured distance values of the point P to be measured, two data are arbitrarily selected from the plurality of distance data.

When the difference between the two distance data $D_1$ and $D_2$ does not exceed the reference value $D_0$, i.e., $|D_1-D_2|<D_0$ holds, the average value of the two distance data $D_1$ and $D_2$ is calculated, and is extracted as regular distance data. On the other hand, when the difference between the two distance data $D_1$ and $D_2$ exceeds the reference value $D_0$, i.e., $|D_1-D_2| \geq D_0$ holds, the distance data, which has high continuity with regular distance data at other points to be measured located in the vicinity of the point P to be measured, is extracted as regular distance data from the two distance data $D_1$ and $D_2$.

In this way, when the shape measurement apparatus of this embodiment uses a position setting/changing mechanism for setting and changing the point to be measured by setting and changing the relative positional relationship between the optical distance measuring device (e.g., a laser displacement meter) and the object to be measured, distance measurements are performed while setting and changing the relative position between the optical distance measuring device and the object to be measured, so that the angle the optical axis of the optical distance measuring device makes with a predetermined identical point to be measured on the object to be measured having an arbitrary free curved surface becomes a plurality of different angles.

When the shape measurement apparatus of this embodiment uses an arithmetic processing unit for determining a regular measured distance by selecting or averaging a plurality of measured distance values corresponding to a plurality of measurements for the identical point to be measured on the predetermined surface to be measured, measurement errors included in the measured distance data can be reduced or removed.

More specifically, when distance data at the respective points measured by the optical distance measurement device include only one measurement data at the identical point to be measured, the distance data is extracted as regular distance data. On the other hand, when the distance data include two or more different measurement data at the identical point to be measured, two different distance data are selected from these distance data, and it is checked if the difference between these two selected different distance data exceeds the reference value.

When the difference between the two different distance data does not exceed the reference value, the average value of the two different distance data is calculated, and is extracted as regular distance data. On the other hand, when the difference between the two different distance data exceeds the reference value, one of the two different distance data, which has high continuity with regular distance data at the points to be measured located in the vicinity of the point to be measured, is extracted as regular distance data.

When the difference between the two different distance data does not exceed the reference value, one of these distance data may be further selected and extracted as regular distance data without calculating the average value of the two different distance data. Also, the reference value to be compared with the difference between the two different distance data is preferably set in correspondence with the required measurement precision at the point to be measured.

The shape measurement apparatus of this embodiment has substantially the same arrangement as that of the first embodiment shown in FIGS. 9 and 10, except for the control mechanism 18. Note that the shape measurement apparatus of this embodiment executes the operation for removing or reducing measurement errors caused by oblique irradiation of measurement light in the first embodiment shown in FIGS. 11 to 14 in substantially the same manner.

More specifically, the control mechanism 18 comprises a measurement data storage unit 15 for storing distance data and position data of the object 5 to be measured in a memory, an arithmetic processing unit 16 for performing selection processing or averaging processing of the distance data stored in the memory, and a shape data forming unit 17 for forming the shape data of the object 5 to be measured on the basis of the selected or average distance data and the position data.

The control mechanism 18 with the above arrangement has the following four functions:

(i) the function of the measurement data storage unit 15: a function of storing the distance data at the respective points to be measured, which are measured by the laser displacement meter 6, and the position data of the respective points to be measured, which are measured by the five encoders 31 to 35, in the memory;

(ii) the function of the arithmetic processing unit 16: a function of executing the selection processing or averaging processing of the distance data at the respective points to be measured stored in the memory by the measurement data storage unit 15 in correspondence with at least two different irradiation angles of measurement light onto the object 5 to be measured;

(iii) the function of the shape data forming unit 17: a function of generating two- or three-dimensional data of the object 5 to be measured on the basis of the distance measurement data and the position data at the respective points to be measured, which are stored in the memory after the selection processing or averaging processing of the arithmetic processing unit 16; and (iv) the function of the central control processing: a function of controlling the operations of the sensor driving circuit 11, motor driving circuit 12, encoder driving circuit 13, measurement data storage unit 15, arithmetic processing unit 16, and shape data forming unit 17.

Furthermore, the arithmetic processing unit 16 has the following four functions:

<1> a function of extracting one distance data as regular distance data when distance data at the points to be measured stored in the memory include only one distance data at the identical point to be measured;

<2> a function of selecting two different distance data from two or more different distance data when distance data at the points to be measured stored in the memory include the two or more different distance data at the identical point to be measured, and checking if the difference between the two different distance data exceeds the reference value;

<3> a function of calculating the average value of two different data and extracting the average value as regular distance data, or further selecting one of the two different distance data and extracting the selected data as regular distance data, when the difference between the two different distance data selected at the identical point to be measured does not exceed the reference value; and <4> a function of extracting one of two different distance data, which has high continuity with regular distance data at the points to be measured located in the vicinity of the point to be measured, as regular distance data, when the difference between the two different distance data selected at the identical point to be measured exceeds the reference value.

The method of measuring the shape of an object to be measured having an arbitrary curved surface as the operation of the shape measurement apparatus of this embodiment will be described below with reference to FIGS. 15 to 18 and FIG. 23. Note that steps 100 to 158 shown in FIGS. 15 to 18 in this embodiment are substantially the same as those in the first embodiment, except for step 156.

More specifically, in step 156, the control mechanism 18 checks based on the position data of the Z stage 10 input from the encoder 34 if the downward movement of the Z stage 10 within the predetermined moving range has been completed. If the downward movement of the Z stage 10 within the predetermined moving range has not been completed yet, the processing of the control mechanism 18 advances to step 158. On the other hand, if the downward movement of the Z stage 10 within the predetermined moving range has been completed, the processing of the control mechanism 18 advances to step 170.

In step 170, the control mechanism 18 controls the arithmetic processing unit 16 to select and mark one of unevaluated points to be measured from all the points to be measured on the object 5 to be measured stored in the memory. The processing of the control mechanism 18 advances to step 172.

In step 172, the control mechanism 18 controls the arithmetic processing unit 16 to check if only one distance data is obtained at the marked point to be measured. If only one distance data is obtained at the marked point to be measured, the control mechanism 18 sets the distance data as regular distance data, and the processing of the control mechanism 18 advances to step 184. On the other hand, if two or more different distance data are obtained at the marked point to be measured, the processing of the control mechanism 18 advances to step 174.

In step 174, the control mechanism 18 controls the arithmetic processing unit 16 to check if only two different distance data are obtained at the marked point to be measured. If only two different distance data are obtained at the marked point to be measured, the processing of the control mechanism 18 advances to step 178. On the other hand, if three or more different distance data are obtained at the marked point to be measured, the processing of the control mechanism 18 advances to step 176.

In step 176, the control mechanism 18 controls the arithmetic processing unit 16 to arbitrarily select two different distance data from the three or more different distance data at the marked point to be measured. The processing of the control mechanism 18 then advances to step 178.

In step 178, the control mechanism 18 controls the arithmetic processing unit 16 to check if the difference between the two different distance data obtained at the marked point to be measured exceeds a predetermined reference value. If the difference between the two different distance data exceeds the reference value, the processing of the control mechanism 18 advances to step 182. On the other hand, if the difference between the two different distance data does not exceed the reference value, the processing of the control mechanism 18 advances to step 180.

In step 180, the control mechanism 18 controls the arithmetic processing unit 16 to select distance data having high continuity with regular distance data at the points to be measured located in the vicinity of the point to be measured from the two different distance data obtained at the marked point to be measured, and sets the selected data as regular distance data. The processing of the control mechanism 18 advances to step 184.

In step 182, the control mechanism 18 controls the arithmetic processing unit 16 to average the two different distance data obtained at the marked point to be measured, and sets the average data as regular distance data. The processing of the control mechanism 18 advances to step 184.

Subsequently, in step 184, the control mechanism 18 controls the measurement data storage unit 15 to re-store the regular distance data obtained at the marked point to be measured in the memory. The processing of the control mechanism 18 advances to step 186.

In step 186, the control mechanism 18 controls the arithmetic processing unit 16 to check if unevaluated points to be measured still remain in all points to be measured of the object 5 to be measured stored in the memory. If at least one unevaluated point to be measured remains, the processing of the control mechanism 18 returns to step 170. On the other hand, if no unevaluated points to be measured remain, the processing of the control mechanism 18 returns to step 190.

Finally, in step 190, the control mechanism 18 controls the shape data forming unit 17 to form two- or three-dimensional shape data of the object 5 to be measured on the basis of the distance data and position data of all the points to be measured on the side surface, shoulder surface, and upper surface of the object 5 to be measured, which are re-stored in the memory, and outputs the formed shape data to the CAD apparatus 19. The CAD apparatus 19 displays or processes information associated with the two- or three-dimensional shape of the object 5 to be measured on the basis of the shape data input from the control mechanism 18, or executes various kinds of image processing, and the like.

Third Embodiment

Distance measurements corresponding to a plurality of different scanning methods in a shape measurement apparatus of this embodiment will be explained below.

When the object to be measured has a shape having a complicated free curved shape, distance measurements at the respective points to be measured on the object to be measured are executed along a plurality of different scanning directions, so as to obtain measured distances at all the points to be measured required for the object to be measured. In order to obtain the entire shape of the object to be measured, the distance data at the respective points to be measured obtained by the plurality of different scanning methods are combined.

In this case, discontinuous surface regions of distance data may often be generated on the joint portion of two different distance data obtained by two different scanning methods due to excessive or insufficient distance data for the identical point to be measured. For this reason, the distance data values at the points to be measured on the object to be measured are not always accurate ones that correspond to the actual shape of the object to be measured, and often include measurement errors that cannot be ignored.

In view of this problem, the inventors of the present application found that a high precision of the measured distance can be guaranteed by canceling out any discontinuous surface regions which are readily generated upon joining distance data obtained by different scanning methods on the basis of distance measurements that use a plurality of different scanning methods in the contact and non-contact type shape measurement methods using distance measuring devices, which are not limited to an optical distance measuring device.

The principle of the measurement method that can remove measurement errors caused by discontinuous surface regions of distance data obtained by different scanning methods in the shape measurement apparatus of this embodiment will be described below.

Upon measuring the shape of an object to be measured having an arbitrary free curved surface by a plurality of different scanning methods, distance measurements of the surface to be measured are performed, so that two scanning regions on the surface to be measured by different scanning methods overlap each other with respect to the identical point to be measured located on the boundary portion between two measurement regions on the surface to be measured by the different scanning methods and its neighboring region. Note that distance measurements at the point to be measured by each scanning method are attained by changing the relative positional relationship between the object to be measured and the distance measuring device in units of predetermined pitches.

As a result, on the boundary portion between the two measurement regions on the surface to be measured by the different scanning methods and its neighboring region, distance measurements are performed for the identical point to be measured so as to acquire a plurality of distance data by a plurality of different scanning methods. By calculating the weighted mean value of the plurality of measurement values obtained by the plurality of different scanning methods, measurement errors included in the measured distance values can be removed.

Figure 24:
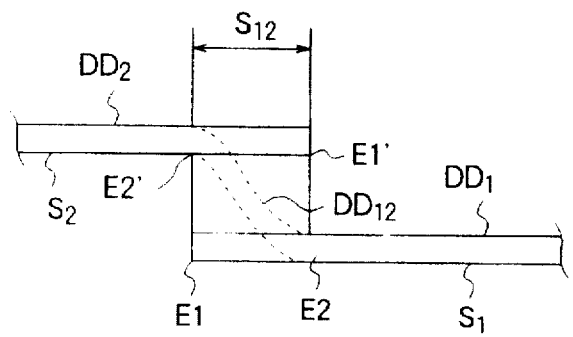
FIG. 24 is a sectional view showing the method of joining measurement data obtained on the basis of different scanning methods in a shape measurement apparatus according to the third embodiment of the present invention.

Note that the method of calculating the weighted mean value of the plurality of measurement values is preferably selected in correspondence with the shape of the object to be measured. The simplest example will be described below. When a distance data group $DD_1$ in a first region $S_1$ of the surface to be measured, and a distance data group $DD_2$ in a second region $S_2$ of the surface to be measured are obtained by two different scanning methods, as shown in FIG. 24, two points E1 and E1' to be measured located at the leading end positions of the two regions $S_1$ and $S_2$ on the surface to be measured, and two points E2 and E2' to be measured located at the trailing end positions are calculated, in an overlapping region $S_{12}$ of the surface to be measured, where the two distance data groups $DD_1$ and $DD_2$ overlap each other.

Of the two distance data groups $DD_1$ and $DD_2$, the weighting coefficient for distance data at the two points E1 and E1' to be measured is set to be 0, the weighting coefficient for distance data at the two points E2 and E2' to be measured is set to be 1, and weighting coefficients W for distance data at a plurality of points to be measured located between the two points E1 and E2 to be measured and for distance data at a plurality of points to be measured located between the two points E1' and E2' to be measured are set in turn in the ascending or descending order to have values within the range 0<W<1.

The weighted mean processing between the two weighted distance data groups $DD_1$ and $DD_2$ generates a distance data group $DD_{12}$ in which distance data obtained by the two different scanning methods at the central portion of the overlapping region $S_{12}$ of the surface to be measured have equal weighting coefficients, as a regular distance data group. In the distance data group $DD_{12}$ on the overlapping region $S_{12}$, measurement errors caused by discontinuous surface regions of the distance data obtained by different scanning methods can be removed.

Therefore, when the shape measurement apparatus of this embodiment uses a position setting/changing mechanism for setting and changing the point to be measured by setting and changing the relative positional relationship between the distance measuring device (e.g., a laser displacement meter, an ultrasonic distance sensor, a probe type distance meter, or the like) and the object to be measured, distance measurements are performed while setting and changing the relative position between the distance measuring device and the object to be measured, so that two scanning areas by different scanning methods overlap each other with respect to the identical point to be measured which is located on the boundary portion between two measurement regions of the different scanning methods and its neighboring region on an object to be measured having an arbitrary free curved surface.

When the shape measurement apparatus of this embodiment uses an arithmetic processing unit for determining a regular measured distance by calculating the weighted mean of a plurality of measured distance values corresponding to a plurality of measurements in which the relative position of the distance measuring device differs with respect to the identical point to be measured on the predetermined surface to be measured, measurement errors caused by discontinuous surface regions of distance data obtained by different scanning methods can be removed.

More specifically, when distance data obtained at the respective points measured by the distance measuring device include only one distance data obtained at the identical point to be measured, the distance data is extracted as regular distance data.

On the other hand, when distance data include a plurality of different distance data obtained at the identical point to be measured, the weighted mean of the distance data corresponding to different scanning methods is calculated, and is extracted as regular distance data.

The shape measurement apparatus of this embodiment has substantially the same arrangement as that of the first embodiment shown in FIGS. 9 and 10, except for the control mechanism 18. Note that the shape measurement apparatus of this embodiment executes the operation for removing or reducing measurement errors caused by oblique irradiation of measurement light in the first embodiment shown in FIGS. 11 to 14 in substantially the same manner.

More specifically, the control mechanism 18 comprises a measurement data storage unit 15 for storing distance data and position data of the object 5 to be measured in a memory, an arithmetic processing unit 16 for performing weighted mean processing of the distance data stored in the memory, and a shape data forming unit 17 for forming the shape data of the object 5 to be measured on the basis of the processed distance data and position data.

The control mechanism 18 with the above arrangement has the following four functions:

(i) the function of the measurement data storage unit 15: a function of storing the distance data at the respective points to be measured, which are measured by the laser displacement meter 6, and the position data of the respective points to be measured, which are measured by the five encoders 31 to 35, in the memory;

(ii) the function of the arithmetic processing unit 16: a function of executing the weighted mean processing of a plurality of different distance data at the respective points to be measured stored in the memory by the measurement data storage unit 15 in correspondence with at least two different scanning methods of measurement light onto the object 5 to be measured;

(iii) the function of the shape data forming unit 17: a function of generating two- or three-dimensional data of the object 5 to be measured on the basis of the distance measurement data and the position data at the respective points to be measured, which are stored in the memory after the weighted mean processing of the arithmetic processing unit 16; and (iv) the function of the central control processing: a function of controlling the operations of the sensor driving circuit 11, motor driving circuit 12, encoder driving circuit 13, measurement data storage unit 15, arithmetic processing unit 16, and shape data forming unit 17.

Furthermore, the arithmetic processing unit 16 has the following two functions:

<1> a function of extracting one distance data as regular distance data when distance data at the respective points to be measured stored in the memory include only one distance data obtained at the identical point to be measured; and <2> a function of calculating the weighted mean of distance data corresponding to different scanning methods when distance data at the respective points to be measured stored in the memory include two or more different distance data obtained at the identical point to be measured.

Figure 15:
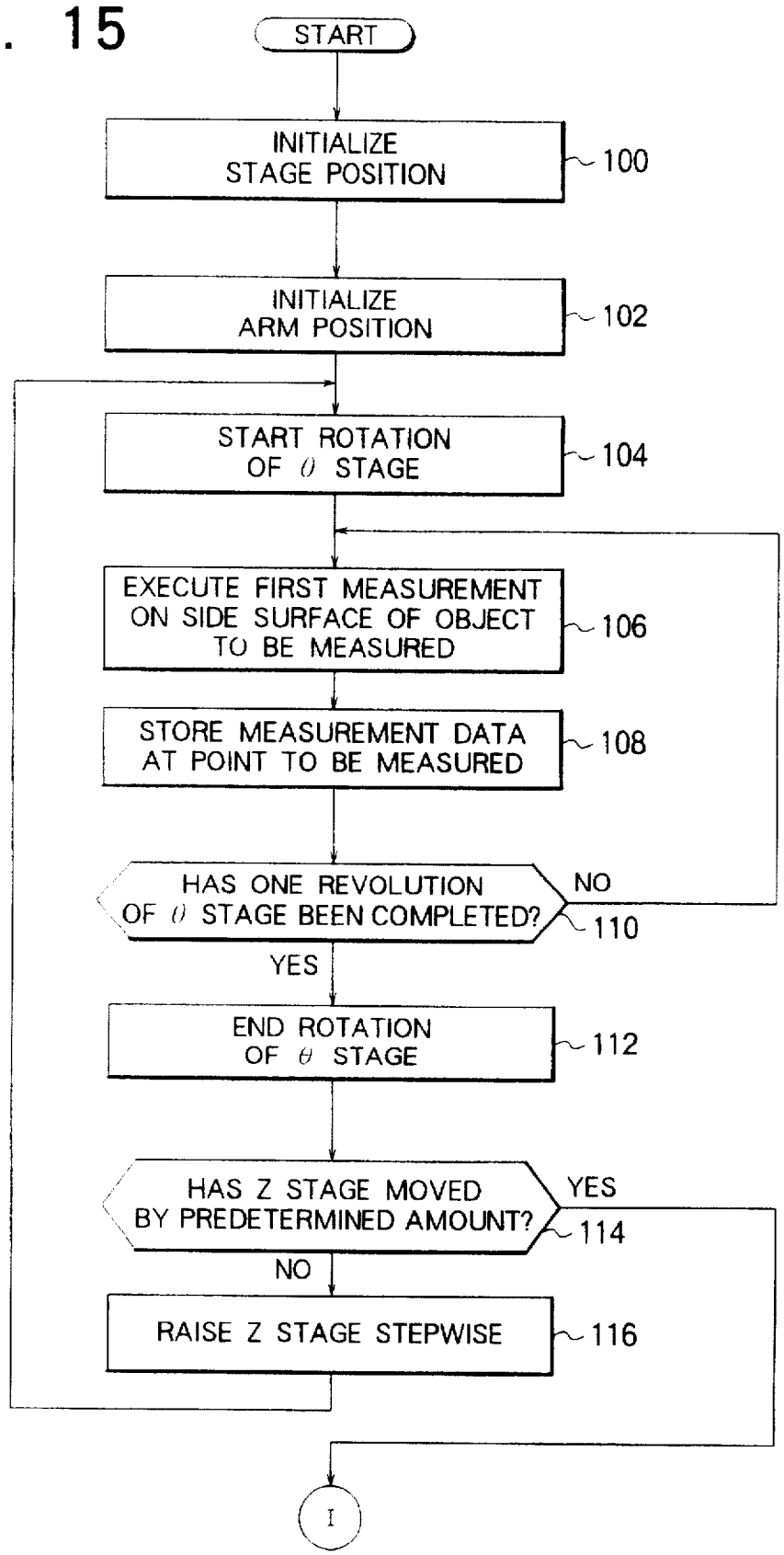
FIGS. 15 to 19 are flow charts showing, in turn, the operation procedures in the shape measurement apparatus shown in FIG. 9.
Figure 16:
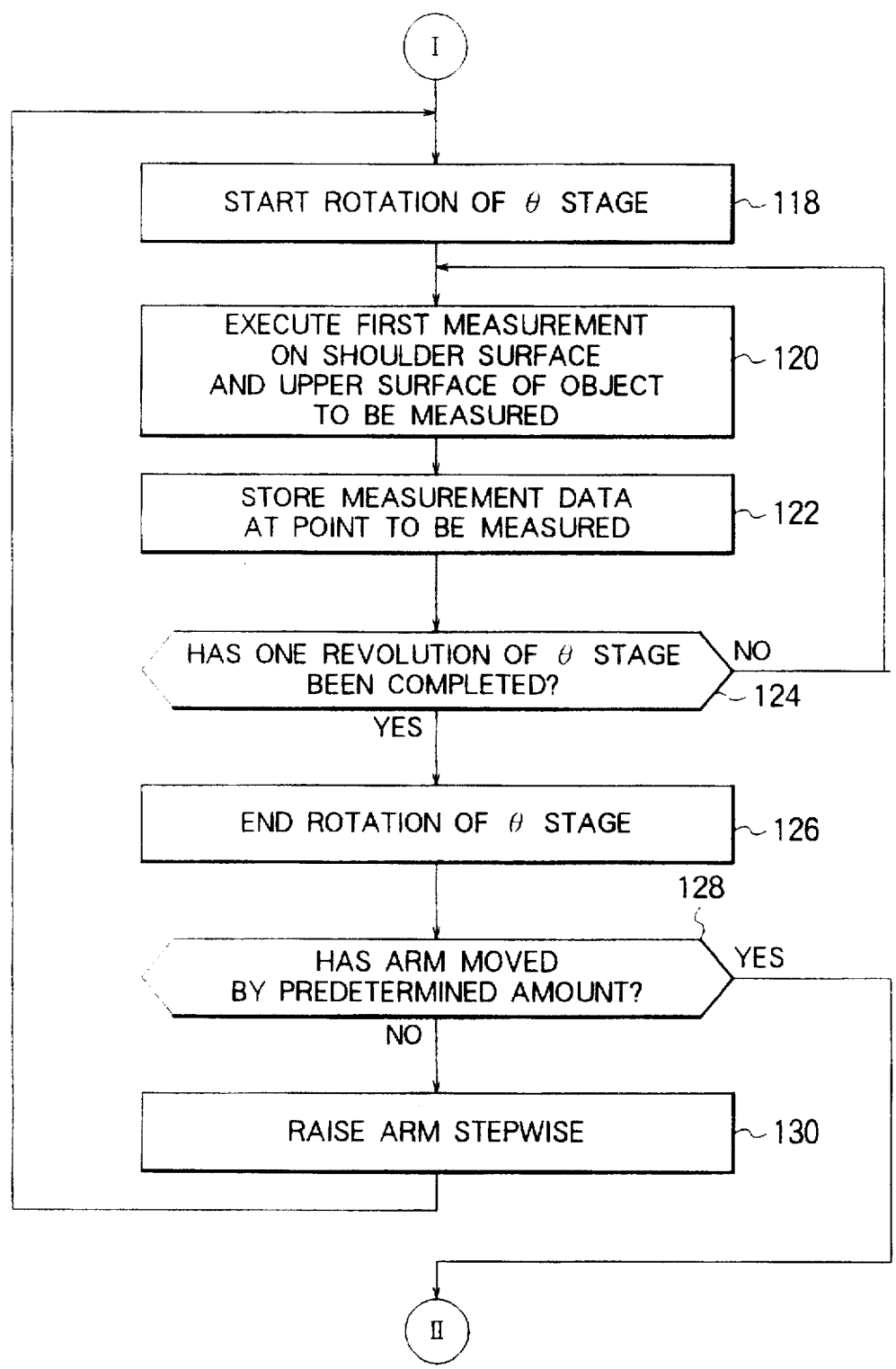
Figure 17:
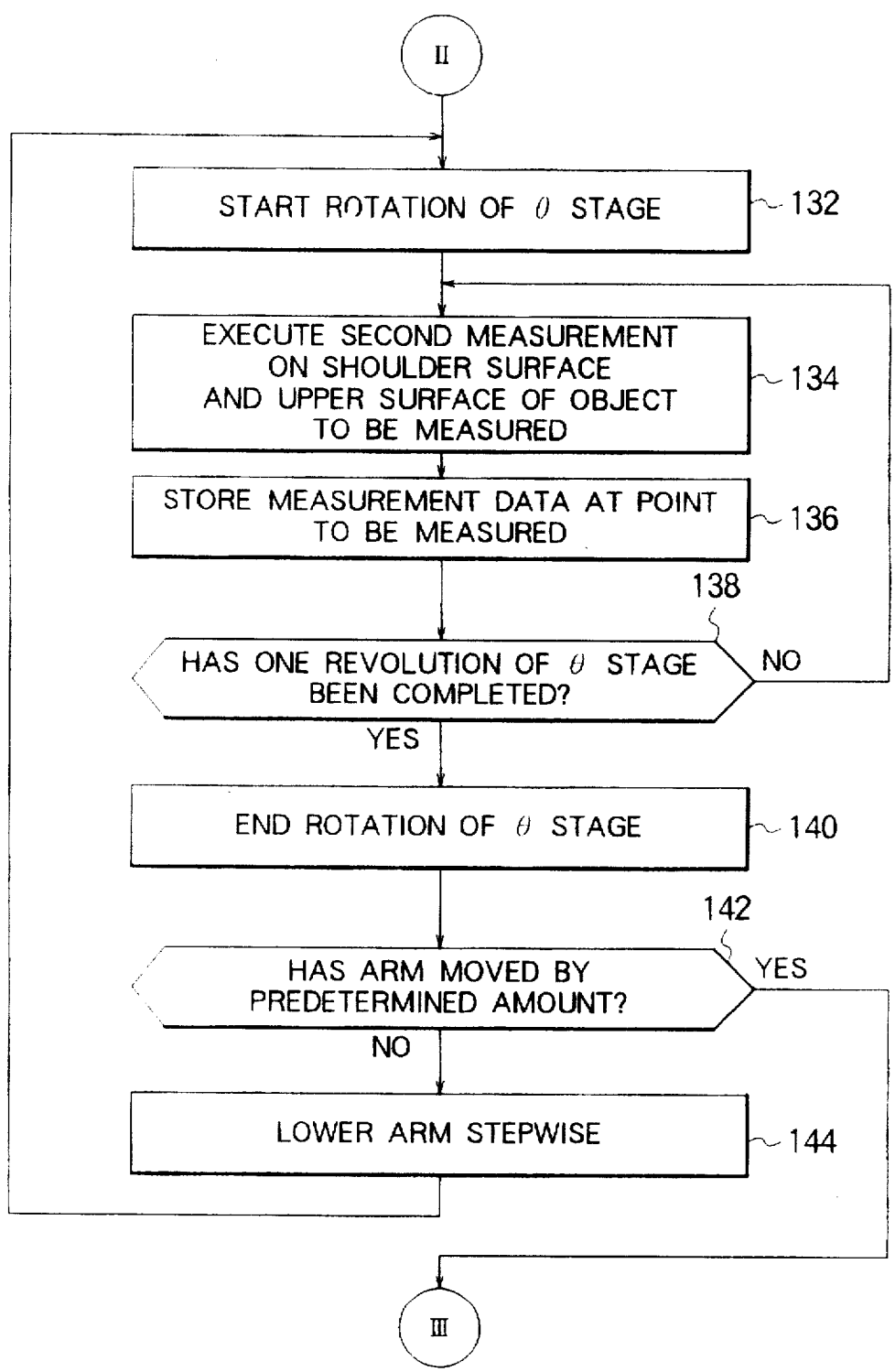
Figure 18:
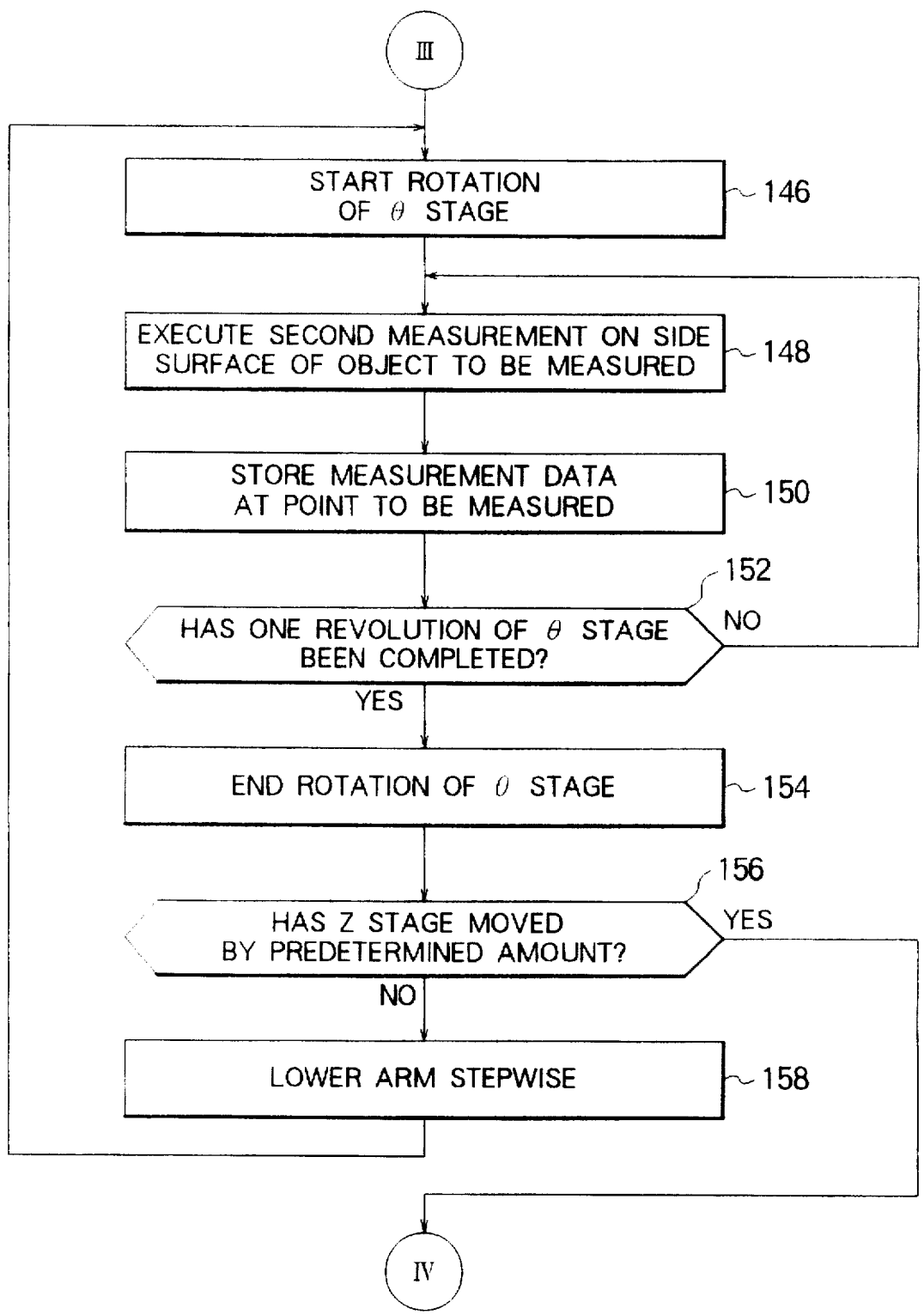
Figure 19:
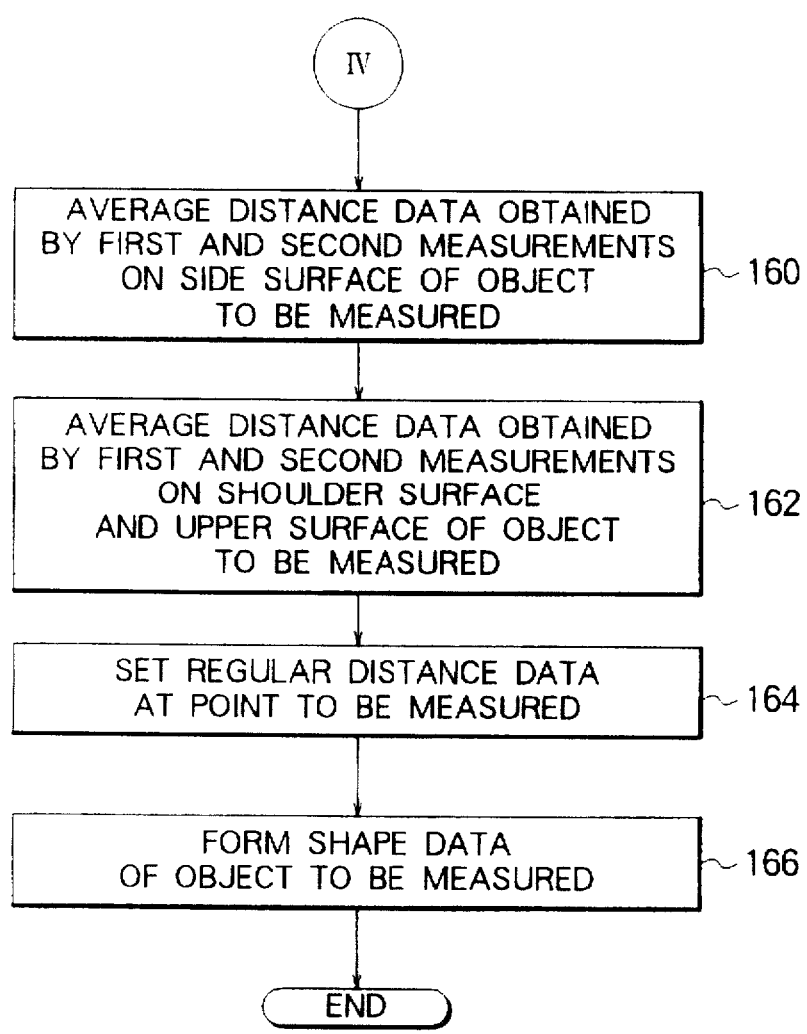
Figure 25:
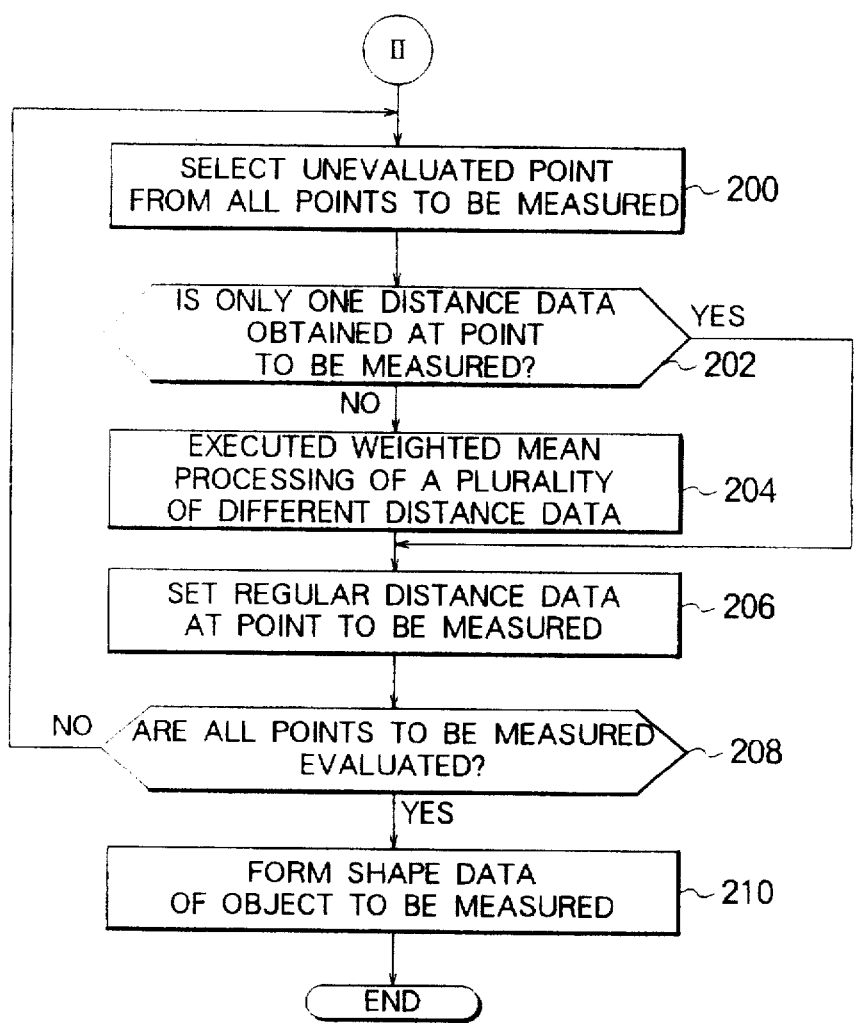
FIG. 25 is a flow chart showing, in turn, the operation procedures in the shape measurement apparatus according to the third embodiment of the present invention.

The method of measuring the shape of an object to be measured having an arbitrary free curved shape as the operation of the shape measurement apparatus of this embodiment will be described below with reference to FIGS. 15, 16, and 25. In this embodiment, steps 100 to 130 shown in FIGS. 15 and 16 are substantially the same as those in the first embodiment, except for step 128.

More specifically, in step 128, the control mechanism 18 checks based on the position data of the arm 7 input from the encoder 35 if the upward movement of the arm 7 within the predetermined moving range has been completed. If the upward movement of the arm 7 within the predetermined moving range has not been completed yet, the processing of the control mechanism 18 advances to step 130. On the other hand, if the upward movement of the arm 7 within the predetermined moving range has been completed, i.e., if the optical axis of the laser displacement meter 6 extends perpendicularly to the X-Y plane, the processing of the control mechanism 18 advances to step 200.

Figure 26:
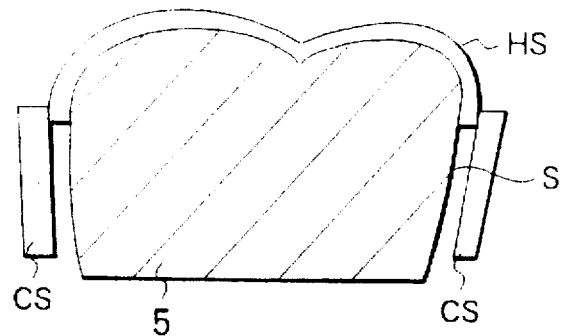
FIG. 26 is a sectional view showing the different scanning methods to be executed in correspondence with the shape of the object to be measured in the shape measurement apparatus according to the third embodiment of the present invention.

In steps 104 to 116, as shown in FIG. 26, measurements on the side surface of the surface S to be measured of the object 5 to be measured are performed on the basis of a cylindrical scanning method CS as the first scanning method effective for measuring the shape of a cylindrical portion of the object to be measured. In steps 118 to 130, measurements on the shoulder surface and upper surface of the surface S to be measured of the object 5 to be measured are performed on the basis of a semi-spherical scanning method HS1 as the second scanning method effective for measuring the shape of a semi-spherical portion of the object to be measured. Note that the scanning regions of the cylindrical scanning method CS and the semi-spherical scanning method HS are set so that their boundary portions overlap each other.

Subsequently, in step 200, the control mechanism 18 controls the arithmetic processing unit 16 to select and mark one of unevaluated points to be measured from all points to be measured on the object 5 to be measured stored in the memory. The processing of the control mechanism 18 advances to step 202.

In step 202, the control mechanism 18 controls the arithmetic processing unit 16 to check if only one distance data is obtained at the marked point to be measured. If only one distance data is obtained at the marked point to be measured, the control mechanism 18 sets the distance data as regular distance data, and the processing of the control mechanism 18 advances to step 206. On the other hand, if two or more different distance data are obtained at the marked point to be measured, the processing of the control mechanism 18 advances to step 204.

In step 204, the control mechanism 18 controls the arithmetic processing unit 16 to calculate the weighted mean of at least two different distance data obtained by different scanning methods in association with the identical point to be measured on the object 5 to be measured. More specifically, the control mechanism 18 calculates the point E1 to be measured located at the leading end position of each scanning region and the point E2 to be measured located at the trailing end position of each scanning region in a region where the scanning regions on the surface to be measured corresponding to different scanning methods overlap each other.

Thereafter, the weighting coefficient for distance data at each point E1 to be measured is set to be 0, the weighting coefficient for distance data at each point E2 to be measured is set to be 1, and weighting coefficients W for distance data at a plurality of points to be measured located between the two points E1 and E2 to be measured are set in turn in the ascending or descending order to have values within the range $0<W<1$. The sum total of the weighted distance data group is set as a regular distance data group. The processing of the control mechanism 18 then advances to step 206.

In step 206, the control mechanism 18 controls the measurement data storage unit 15 to re-store the regular distance data at the marked point to be measured in the memory. The processing of the control mechanism 18 advances to step 208.

Subsequently, in step 208, the control mechanism 18 controls the arithmetic processing unit 16 to check if unevaluated points to be measured still remain in all points to be measured of the object 5 to be measured stored in the memory. If at least one unevaluated point to be measured remains, the processing of the control mechanism 18 returns to step 200. On the other hand, if no unevaluated points to be measured remain, the processing of the control mechanism 18 returns to step 210.

Finally, in step 210, the control mechanism 18 controls the shape data forming unit 17 to form two- or three-dimensional shape data of the object 5 to be measured on the basis of the distance data and position data of all the points to be measured on the side surface, shoulder surface, and upper surface of the object 5 to be measured, which are re-stored in the memory, and outputs the formed shape data to the CAD apparatus 19. The CAD apparatus 19 displays or processes information associated with the two- or three-dimensional shape of the object 5 to be measured on the basis of the shape data input from the control mechanism 18, or executes various kinds of image processing, and the like.

The present invention is not limited to the above-mentioned specific embodiments, and various modifications may be made.

For example, in the first and second embodiments, when the shape of the object to be measured such as a dental plaster model, measurements on the upper surface of the object to be measured are performed in the same manner as those for the shoulder surface. However, the position setting/changing mechanism may operate to perform the measurements on the upper surface of the object to be measured to be different from those on the shoulder surface.

More specifically, in a state wherein the position β of the arm is set so that the optical axis of the laser displacement meter extends perpendicularly to the X-Y plane and the pivotal motion of the θ stage is stopped, the first measurements associated with the distance and position of the point to be measured on the upper surface of the object to be measured, and processing for moving the X and Y stages by a predetermined amount are alternately and repetitively executed. After the θ stage is pivoted through 180° about the Z-axis, the second measurements associated with the distance and position of the point to be measured on the upper surface of the object to be measured, and processing for moving the X and Y stages by a predetermined amount are alternately and repetitively executed.

At least two different distance data obtained at the identical point to be measured on the upper surface of the object to be measured, i.e., a plurality of different distance data corresponding to the angles α and −α ($0°\leq\alpha\leq 90°$) formed between the plane perpendicular to the optical axis of the laser displacement meter 6 and the surface to be measured, are averaged, and the averaged distance data at the point to be measured is used as regular distance data, thereby removing or reducing measurement errors caused by the tilt of the surface to be measured with respect to the optical axis of the optical distance measuring device.

In the third embodiment as well, when the shape of the object to be measured such as a dental plaster model, measurements on the upper surface of the object to be measured are performed in the same manner as those for the shoulder surface. However, the position setting/changing mechanism may operate to perform the measurements on the upper surface of the object to be measured to be different from those on the shoulder surface.

More specifically, in a state wherein the position β of the arm is set so that the optical axis of the laser displacement meter extends perpendicularly to the X-Y plane and the pivotal motion of the θ stage is stopped, measurements associated with the distance and position of the point to be measured on the upper surface of the object to be measured, and processing for moving the X and Y stages by a predetermined amount are alternately and repetitively executed.

Figure 27:
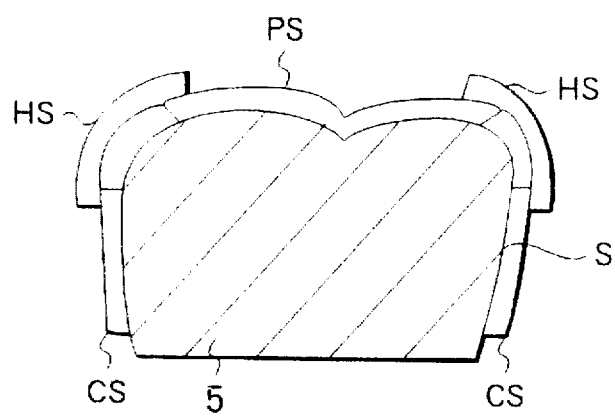
FIG. 27 is a sectional view showing a modification of executing the different scanning methods in the shape measurement apparatus according to the third embodiment of the present invention.

At this time, as shown in FIG. 27, measurements on the upper surface of the surface S to be measured of the object 5 to be measured are performed on the basis of a plane scanning method PS as the third scanning method effective for measuring the shape of a plane portion of the object to be measured. Note that the scanning regions of the semi-spherical scanning method HS and the plane scanning method PS are set so that their boundary portions overlap each other.

The weighted mean of at least two different distance data obtained at the identical point to be measured corresponding to different scanning methods on the upper surface and shoulder surface of the object to be measured is calculated, and the weighted mean distance data at the point to be measured is used as regular distance data, thus removing or reducing measurement errors caused upon combining distance data in different scanning regions.

Furthermore, in the third embodiment, the distance to the object to be measured is measured using the laser displacement meter as the distance measuring device. However, for example, an ultrasonic distance sensor or the like may be used as the distance measuring device other than the optical distance measuring device such as the laser displacement meter. Also, as a contact type distance measuring device other than such non-contact type distance measuring device, for example, a probe type distance meter may be used.

As has been described in detail above, in the shape measurement apparatus and method of the present invention, since measurement errors caused by the irradiation angle of measurement light from the optical distance measuring device onto the object to be measured, i.e., the tilt of the surface where the point to be measured is present with respect to the optical axis of the optical distance measuring device are removed or reduced, the shape of an object to be measured having an arbitrary shape such as a complicated free curved surface can be measured with high precision.

In the shape measurement apparatus and method of the present invention, since measurement errors caused by discontinuities in the surface generated at the joint portion of measurement data of the object to be measured based on a plurality of different scanning methods are reduced, the shape of an object to be measured having an arbitrary shape such as a complicated free curved surface can be measured with high precision.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No.351923/1995, 351925/1995 and 351926/1995 all filed on Dec. 27, 1995 are hereby incorporated by reference.

What is claimed is:

1. A shape measurement apparatus comprising:

an optical distance measuring device which comprises an irradiation unit for irradiating measurement light onto a point to be measured on an object to be measured, and a light-receiving unit for receiving the measurement light reflected at the point to be measured, and measures a distance to the point to be measured;

a position setting/changing mechanism which sets and changes the point to be measured by setting and changing a relative positional relationship between the object to be measured and said optical distance measuring device, and can set, for each point to be measured, a plurality of different angles including α and −α ($0°\leq\alpha\leq 90°$) in an identical plane as a tilt angle of a surface of the object to be measured with respect to a plane perpendicular to an optical axis of said optical distance measuring device;

a position detection mechanism for detecting a relative position between said optical distance measuring device and the point to be measured, which is set or changed by said position setting/changing mechanism; and a shape data forming unit for forming shape data of the object to be measured on the basis of position data detected by said position detection mechanism and representing the relative position between the point to be measured and said optical distance measuring device, and distance data measured by said optical distance measuring device and representing the distance between the point to be measured and said optical distance measuring device.

2. An apparatus according to claim 1, further comprising a control mechanism for controlling operations of said optical distance measuring device, said position setting/changing mechanism, said position detection mechanism, and said shape data forming unit.

3. An apparatus according to claim 1, further comprising a data storage unit for storing the distance data to the point to be measured by said optical distance measuring device, and the position data of the point to be measured detected by said position detection mechanism.

4. An apparatus according to claim 3, further comprising a control mechanism for controlling operations of said optical distance measuring device, said position setting/changing mechanism, said position detection mechanism, said data storage unit, and said shape data forming unit.

5. An apparatus according to claim 1, further comprising an arithmetic processing unit for calculating an average value of a plurality of different distance data measured by said optical distance measuring device in correspondence with different setting states of the optical axis of said optical distance measuring device at each point to be measured, and outputting the average value as regular distance data to said shape data forming unit.

6. An apparatus according to claim 5, further comprising a control mechanism for controlling operations of said optical distance measuring device, said position setting/changing mechanism, said position detection mechanism, said arithmetic processing unit, and said shape data forming unit.

7. An apparatus according to claim 5, further comprising a data storage unit for storing the distance data to the point to be measured by said optical distance measuring device, and the position data of the point to be measured detected by said position detection mechanism.

8. An apparatus according to claim 7, further comprising a control mechanism for controlling operations of said optical distance measuring device, said position setting/changing mechanism, said position detection mechanism, said data storage unit, said arithmetic processing unit, and said shape data forming unit.

9. An apparatus according to claim 5, wherein when only one distance data is obtained at each point to be measured, said arithmetic processing unit outputs the distance data as regular distance data to said shape data forming unit.

10. An apparatus according to claim 5, wherein said arithmetic processing unit checks if a difference between two different distance data, which are arbitrarily selected from a plurality of different distance data corresponding to the different setting states of the optical axis of said optical distance measuring device at each point to be measured, exceeds a reference value, calculates the average value of the two different distance data and outputs the average value as regular distance data to said shape data forming unit when the difference between the two different distance data does not exceed the reference value, and selects one, which has higher continuity with regular distance data at the points to be measured located in the vicinity of the point to be measured, from the two different distance data, and outputs the selected distance data as regular distance data to said shape data forming unit when the difference between the two different distance data exceeds the reference value.

11. An apparatus according to claim 1, wherein said position setting/changing mechanism sets and changes the relative positional relationship between the object to be measured having a three-dimensional shape and said optical distance measuring device, and said shape data forming unit forms three-dimensional shape data as the shape data of the object to be measured.

12. A shape measurement apparatus comprising:

a distance measuring device for measuring a distance to a point to be measured on an object to be measured;

a position setting/changing mechanism which sets and changes the point to be measured by setting and changing a relative positional relationship between the object to be measured and said distance measuring device, and can set a plurality of different positions as a position of said distance measuring device with respect to each point to be measured;

a position detection mechanism for detecting a relative position between said distance measuring device and the point to be measured, which is set or changed by said position setting/changing mechanism;

an arithmetic processing unit for calculating a weighted mean value of a plurality of different distance data corresponding to different setting states of the position of said distance measuring device at each point to be measured as distance data measured by said distance measuring device and representing the distance between the point to be measured and said distance measuring device, and extracting the weighted mean value as regular distance data; and a shape data forming unit for forming shape data of the object to be measured on the basis of position data detected by said position detection mechanism and representing the relative position between the point to be measured and said distance measuring device, and the regular distance data at the point to be measured extracted by said arithmetic processing unit.

13. An apparatus according to claim 12, further comprising a control mechanism for controlling operations of said distance measuring device, said position setting/changing mechanism, said position detection mechanism, said arithmetic processing unit, and said shape data forming unit.

14. An apparatus according to claim 12, further comprising a data storage unit for storing the distance data to the point to be measured by said distance measuring device, and the position data of the point to be measured detected by said position detection mechanism.

15. An apparatus according to claim 14, further comprising a control mechanism for controlling operations of said distance measuring device, said position setting/changing mechanism, said position detection mechanism, said data storage unit, said arithmetic processing unit, and said shape data forming unit.

16. An apparatus according to claim 12, wherein when only one distance data is obtained at each point to be measured, said arithmetic processing unit outputs the distance data as regular distance data to said shape data forming unit.

17. An apparatus according to claim 12, wherein said position setting/changing mechanism sets and changes the relative positional relationship between the object to be measured having a three-dimensional shape and said distance measuring device, and said shape data forming unit forms three-dimensional shape data as the shape data of the object to be measured.

18. A shape measurement method comprising:

the first step of setting a plurality of different angles including α and −α ($0 \leq \alpha \leq 90°$) in an identical plane as a tilt angle of a surface of an object to be measured with respect to a plane perpendicular to an optical axis of an optical distance measuring device by setting and changing, using a position setting/changing mechanism, a point to be measured on the object to be measured by setting and changing a relative positional relationship between the object to be measured and the optical distance measuring device;

the second step of detecting, using a position detection mechanism, a relative position between the optical distance measuring device and the point to be measured, which is set or changed by the position setting/changing mechanism in the first step, and measuring a distance between the point to be measured and the optical distance measuring device by irradiating measurement light from an irradiation unit of the optical distance measuring device onto the point to be measured and receiving the measurement light reflected at the point to be measured; and the third step of forming shape data of the object to be measured using a shape data forming unit on the basis of position data detected by the position detection mechanism in the second step and representing the relative position between the point to be measured and the optical distance measuring device, and distance data measured by the optical distance measuring device and representing the distance between the point to be measured and the optical distance measuring device.

19. A method according to claim 18, wherein the second step includes the step of storing, in a data storage unit, the distance data to the point to be measured, which is measured by the optical distance measuring device, and the position data of the point to be measured, which is detected by the position detection mechanism.

20. A method according to claim 18, wherein the third step includes the step of calculating, using an arithmetic processing unit, an average value of a plurality of different distance data measured by the optical distance measuring device in correspondence with different setting states of the optical axis of the optical distance measuring device at each point to be measured, and outputting the average value as regular distance data to the shape data forming unit.

21. A method according to claim 20, wherein the second step includes the step of storing, in a data storage unit, the distance data to the point to be measured, which is measured by the optical distance measuring device, and the position data of the point to be measured, which is detected by the position detection mechanism.

22. A method according to claim 20, wherein the third step includes the step of outputting one distance data as regular distance data from the arithmetic processing unit to the shape data forming unit when only the one distance data is obtained at each point to be measured.

23. A method according to claim 20, wherein the third step includes the step of checking, using the arithmetic processing unit, if a difference between two different distance data, which are arbitrarily selected from a plurality of different distance data corresponding to the different setting states of the optical axis of the optical distance measuring device at each point to be measured, exceeds a reference value, calculating the average value of the two different distance data and outputting the average value as regular distance data from the arithmetic processing unit to the shape data forming unit when the difference between the two different distance data does not exceed the reference value, and selecting one, which has higher continuity with regular distance data at the points to be measured located in the vicinity of the point to be measured, from the two different distance data, and outputting the selected distance data as regular distance data from the arithmetic processing unit to the shape data forming unit when the difference between the two different distance data exceeds the reference value.

24. A method according to claim 18, wherein the first step includes the step of setting and changing, using the position setting/changing mechanism, the relative positional relationship between the object to be measured having a three-dimensional shape and the optical distance measuring device, and the third step includes the step of forming, using the shape data forming unit, three-dimensional data as the shape data of the object to be measured.

25. A shape measurement method comprising:

the first step of setting a plurality of different positions as a position of a distance measuring device with respect to each point to be measured by setting and changing, using a position setting/changing mechanism, the point to be measured on an object to be measured by setting and changing a relative positional relationship between the object to be measured and the distance measuring device;

the second step of detecting, using a position detection mechanism, a relative position between the distance measuring device and the point to be measured, which is set or changed in the first step, and measuring, using the distance measuring device, a distance between the point to be measured and the distance measuring device;

the third step of calculating, using an arithmetic processing unit, a weighted mean value of a plurality of different distance data corresponding to different setting states of the position of the distance measuring device as distance data which is measured by the distance measuring device in the second step and represents the distance between the point to be measured and the distance measuring device, and extracting the weighted mean value as regular distance data; and the fourth step of forming, using a shape data forming unit, shape data of the object to be measured on the basis of the position data which is detected by the position detection mechanism in the second step and represents the relative position between the point to be measured and the distance measuring device, and the regular distance data at the point to be measured extracted by the arithmetic processing unit in the third step.

26. A method according to claim 25, wherein the second step includes the step of storing, in a data storage unit, the distance data to the point to be measured, which is measured by the distance measuring device, and the position data of the point to be measured, which is detected by the position detection mechanism.

27. A method according to claim 25, wherein the third step includes the step of outputting one distance data as regular distance data from the arithmetic processing unit to the shape data forming unit when only the one distance data is obtained at each point to be measured.

28. A method according to claim 25, wherein the first step includes the step of setting and changing, using the position setting/changing mechanism, the relative positional relationship between the object to be measured having a three-dimensional shape and the distance measuring device, and the third step includes the step of forming, using the shape data forming unit, three-dimensional data as the shape data of the object to be measured.

\* \* \* \* \*